(12) United States Patent
Ono

(10) Patent No.: US 10,038,856 B2
(45) Date of Patent: Jul. 31, 2018

(54) IMAGING DEVICE, IMAGING METHOD, AND PROGRAM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/498,405

(22) Filed: Apr. 26, 2017

(65) Prior Publication Data

US 2017/0289461 A1 Oct. 5, 2017

Related U.S. Application Data

(63) Continuation of application No. PCT/JP2015/077674, filed on Sep. 30, 2015.

(30) Foreign Application Priority Data

Nov. 21, 2014 (JP) ................................. 2014-236546

(51) Int. Cl.
*H04N 5/243* (2006.01)
*H04N 5/445* (2011.01)
(Continued)

(52) U.S. Cl.
CPC ......... *H04N 5/243* (2013.01); *H04N 5/23229* (2013.01); *H04N 5/23296* (2013.01); *H04N 5/247* (2013.01); *H04N 5/44504* (2013.01)

(58) Field of Classification Search
CPC ............... H04N 5/243; H04N 5/23229; H04N 5/23296; H04N 5/247; H04N 5/44504
See application file for complete search history.

(56) References Cited

U.S. PATENT DOCUMENTS 9,197,827 B2 11/2015 Ono
2010/0134641 A1 6/2010 Marti et al.
(Continued)

FOREIGN PATENT DOCUMENTS

EP 2750374 7/2014
WO 2013146506 10/2013

OTHER PUBLICATIONS

"Search Report of Europe Counterpart Application", dated Sep. 8, 2017, p. 1-p. 7.

(Continued)

*Primary Examiner* — Twyler Haskins
*Assistant Examiner* — Angel L Garces-Rivera
(74) *Attorney, Agent, or Firm* — JCIPRNET

(57) ABSTRACT

An imaging device includes an imaging optical system that includes a first optical system and a second optical system having a common optical axis and having different focal lengths, an imaging element that includes a first sensor group selectively receiving light passing the first optical system and a second sensor group selectively receiving light passing the second optical system, and an image compositing unit that generates a first generated image by performing registration on a plurality of first captured images captured in different states of an optical axis L of the first optical system and by compositing the registered plurality of first captured images and that generates a second generated image by performing registration on a plurality of second captured images captured in different states of the optical axis L of the second optical system and by compositing the registered plurality of second captured images.

20 Claims, 33 Drawing Sheets

(51) Int. Cl.
*H04N 5/247* (2006.01)
*H04N 5/232* (2006.01)

(56) References Cited

U.S. PATENT DOCUMENTS

2015/0009369 A1   1/2015  Ono
2015/0109482 A1*  4/2015  Laroia .................... G02B 13/02
                                                            348/239

OTHER PUBLICATIONS

"International Search Report (Form PCT/ISA/210)", dated Dec. 1, 2015, with English translation thereof, pp. 1-2.
"Written Opinion of the International Searching Authority (Form PCT/ISA/237) of PCT/JP2015/077674", dated Jan. 12, 2015, with English translation thereof, pp. 1-8.
"Search Report of Europe Counterpart Application", dated May 22, 2018, pp. 1-5.

* cited by examiner

FIG. 18
(a)
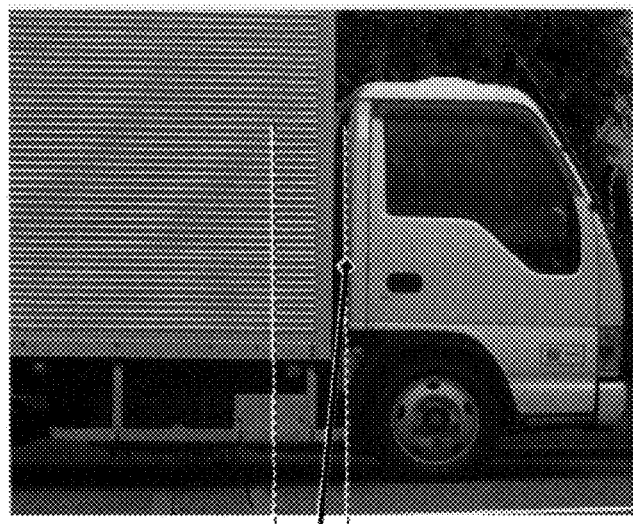
(b)
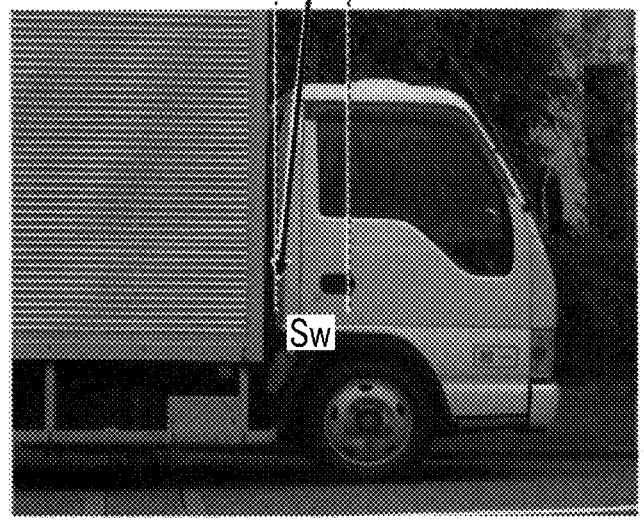

FIG. 19
(a) 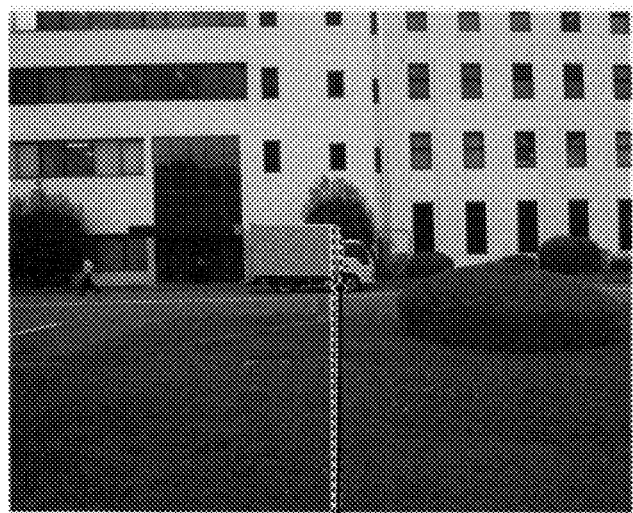
(b) 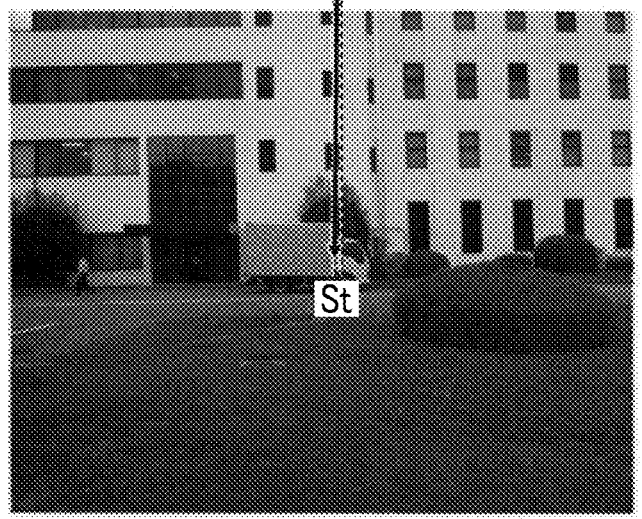

FIG. 20
(a) 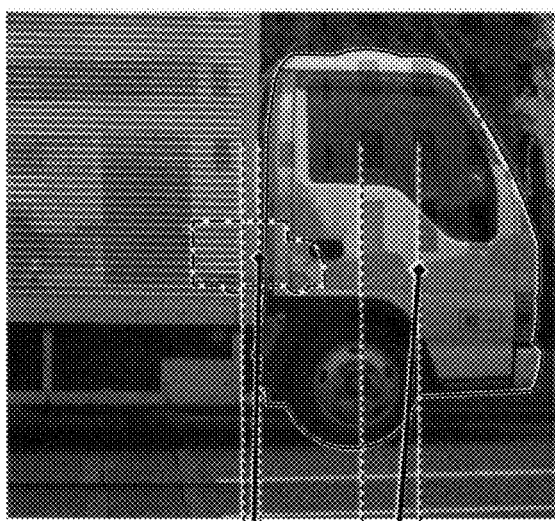
(b) 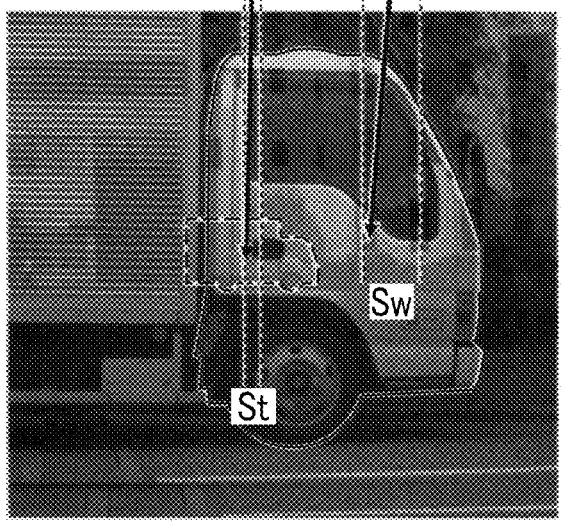

FIG. 21
(a) 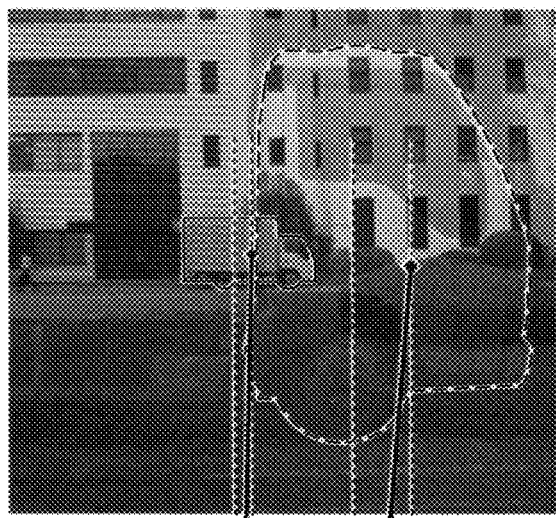
(b) 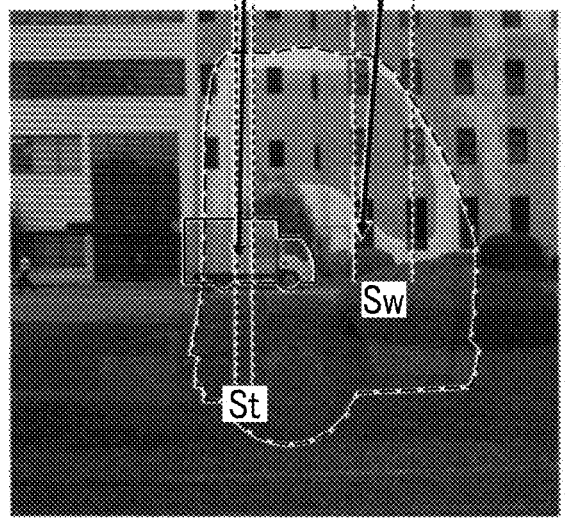

FIG. 30

$$\begin{pmatrix} W1 \\ T1 \end{pmatrix} = \begin{pmatrix} A & B \\ C & D \end{pmatrix}^{-1} * \begin{pmatrix} W2 \\ T2 \end{pmatrix}$$

where the inverse matrix is denoted $M^{-1}$.

FIG. 31

$$W1 = \begin{pmatrix} w1\_11 & w1\_12 & w1\_13 & & \\ w1\_21 & w1\_22 & & & \\ w1\_31 & & & & \\ & & & \ddots & \\ & & & & w1\_mn \end{pmatrix}$$

FIG. 32

$$w1\_ij = \frac{dij \cdot w2\_ij - bij \cdot t2\_ij}{aij \cdot dij - bij \cdot cij}$$

FIG. 33

$$t1\_ij = \frac{-cij \cdot w2\_ij + aij \cdot t2\_ij}{aij \cdot dij - bij \cdot cij}$$

IMAGING DEVICE, IMAGING METHOD, AND PROGRAM

CROSS-REFERENCE TO RELATED APPLICATIONS

This application is a Continuation of PCT International Application No. PCT/JP2015/077674 filed on Sep. 30, 2015, which claims priority under 35 U.S.C. § 119(c) to Patent Application No. 2014-236546 filed in Japan on Nov. 21, 2014, all of which are hereby expressly incorporated by reference into the present application.

BACKGROUND OF THE INVENTION

1. Field of the Invention

The present invention relates to an imaging device, an imaging method, and a non-transitory computer readable recording medium storing a program performing imaging with use of a plurality of types of optical systems having different optical properties and particularly to a technology of improving image quality of a captured image that may be decreased by interference of imaging light (crosstalk) between optical systems.

2. Description of the Related Art

In the field of technology of imaging devices, known is a technology of acquiring a plurality of types of images at the same time by performing imaging with use of an optical system having a plurality of properties.

For example, in WO2013/146506A, disclosed is an imaging device in which a multiple-property lens having various optical properties is combined with a directional sensor. According to this imaging device, a plurality of captured images having at least one of a focal length and a focal distance different from one another can be acquired by using pupil division.

In the imaging device in which the multiple-property lens and the directional sensor are combined, imaging light may interfere (crosstalk) between lenses (optical systems) having different optical properties, and an unintended image component may overlay an intended image. For example, in the case of the multiple-property lens including a wide-angle lens and a telescopic lens, a wide-angle image component and a telescopic image component are mixed. Consequently, a telescopic image overlays a wide-angle image, or a wide-angle image overlays a telescopic image.

Regarding the interference (crosstalk) of imaging light between lenses (optical systems) having different optical properties, a crosstalk component is reduced in the imaging device disclosed in WO2013/146506A by performing image processing in accordance with the optical properties of each lens.

SUMMARY OF THE INVENTION

As described above, image processing can reduce a crosstalk component in an image that is captured by the imaging device in which the multiple-property lens and the directional sensor are combined. However, according to subjects, the properties of the multiple-property lens and the directional sensor, and other imaging conditions, it may be difficult to effectively remove the crosstalk component from the image.

Particularly, in the case of the actually used directional sensor having a low sampling density with an unignorable difference in spatial phase between channels, in the case of the used directional sensor having bad linearity, in the case of imaging light received by the directional sensor having excessively strong or excessively weak intensity, in the case of image light (imaging signal) filtering into an adjacent pixel of the directional sensor, or in the case of a subject image having a sharp edge (contour) component, if the process level of the image processing disclosed in WO2013/146506A is increased, mixed imaging light is highlighted, and image quality may not be sufficiently improved. Accordingly, in the case of performing image processing to reduce a crosstalk component in the image captured by the imaging device in which the multiple-property lens and the directional sensor are combined, an adverse effect may be achieved in the quality of the image, and it is difficult to acquire a favorable image especially in the case of using the directional sensor having a high degree of crosstalk.

In addition, when image processing is performed to reduce influence of interference (crosstalk) of imaging light between optical systems, the amount of time of calculation (the amount of processing time) required in the image processing, cost, and influence on a system accompanied by implementation of an image processing circuit or an image processing program are required to be considered. For example, a long amount of time required for calculation processing, high cost for realizing image processing, or a difficulty in implementing the image processing circuit or the image processing program may be a cause of hindering realization of the image processing and thus is not preferable.

Therefore, a new technology for reducing influence of interference of imaging light between optical systems is desired to be suggested from a different viewpoint from the technology in the related art. Particularly, desired is suggestion of a new image quality improving technology of a simple process configuration that can provide a high-quality desired image, even in the case of a non-preferable actual imaging circumstance, without damaging the property of the imaging device which can acquire a plurality of types of images at the same time.

The present invention is conceived in view of the above matters, and an object thereof is to provide an imaging method and an application technology thereof that can acquire a high-quality image by reducing influence of interference of imaging light between optical systems with a simple process configuration.

One embodiment of the present invention relates to an imaging device comprising an imaging optical system that includes a first optical system and a second optical system having a common optical axis and having different focal lengths, an imaging element that includes a first sensor group selectively receiving light passing the first optical system and a second sensor group selectively receiving light passing the second optical system, and an image generating unit that generates a first generated image on the basis of a first captured image output from the first sensor group and generates a second generated image on the basis of a second captured image output from the second sensor group, in which the image generating unit has an image compositing unit, and the image compositing unit generates the first generated image by performing registration on a plurality of the first captured images captured in different states of the optical axis of the first optical system and by compositing the registrated plurality of first captured images, and generates the second generated image by performing registration on a plurality of the second captured images captured in different states of the optical axis of the second optical system and by compositing the registered plurality of second captured images.

According to the present embodiment, the first generated image is generated by compositing the registered plurality of first captured images. Therefore, even if a crosstalk image made by light passing the second optical system is included in the first captured image, influence of the crosstalk image is weakened in the first generated image, and the clearness of a desired image made by light passing the first optical system can be made favorable. Similarly, since the second generated image is generated by compositing the registered plurality of second captured images, influence of a crosstalk image made by light passing the first optical system is weakened in the second generated image, and the clearness of a desired image made by light passing the second optical system can be made favorable. Accordingly, since the first generated image is generated from the first captured image and the second generated image is generated from the second captured image by image processing, an image of high quality can be acquired by reducing influence of interference of imaging light between optical systems with a simple process configuration without requiring addition of special hardware.

Desirably, the plurality of first captured images is captured in different states of a direction of the optical axis of the first optical system and output from the first sensor group, and the plurality of second captured images is captured in different states of a direction of the optical axis of the second optical system and output from the second sensor group.

According to the present embodiment, the relative positions of the desired image made by light passing the first optical system and the crosstalk image made by light passing the second optical system can be changed among the plurality of first captured images, and influence of the crosstalk image in the first generated image can be effectively weakened. Similarly, the relative positions of the desired image made by light passing the second optical system and the crosstalk image made by light passing the first optical system can be changed among the plurality of second captured images, and influence of the crosstalk image in the second generated image can be effectively weakened.

Desirably, the plurality of first captured images is captured in different states of a relative position of the optical axis of the first optical system with respect to a subject and output from the first sensor group, and the plurality of second captured images is captured in different states of a relative position of the optical axis of the second optical system with respect to the subject and output from the second sensor group.

According to the present embodiment, the relative positions of the desired image made by light passing the first optical system and the crosstalk image made by light passing the second optical system can be changed among the plurality of first captured images, and influence of the crosstalk image in the first generated image can be effectively weakened. Similarly, the relative positions of the desired image made by light passing the second optical system and the crosstalk image made by light passing the first optical system can be changed among the plurality of second captured images, and influence of the crosstalk image in the second generated image can be effectively weakened.

Desirably, the image compositing unit performs registration on the plurality of first captured images on the basis of the state of the optical axis of the first optical system and a focal length of the first optical system and performs registration on the plurality of second captured images on the basis of the state of the optical axis of the second optical system and a focal length of the second optical system.

According to the present embodiment, the plurality of first captured images can be actively registered on the basis of the focal length of the first optical system, and the plurality of second captured images can be actively registered on the basis of the focal length of the second optical system.

A method of the image compositing unit for acquiring the focal length of the first optical system and the focal length of the second optical system is not particularly limited. For example, in the case of the imaging optical system (the first optical system and the second optical system) being interchangeable, the image compositing unit preferably acquires the focal length of the first optical system and the focal length of the second optical system each time the imaging optical system is interchanged. In the case of the imaging optical system (the first optical system and the second optical system) not being interchangeable, the image compositing unit may store and retain the focal length of the first optical system and the focal length of the second optical system. In addition, the image compositing unit may acquire the focal length of the first optical system from adjunct data of the first captured image and may acquire the focal length of the second optical system from adjunct data of the second captured image.

Desirably, the image compositing unit acquires a position of a first reference image portion in each of the plurality of first captured images by analyzing the plurality of first captured images and performs registration on the plurality of first captured images on the basis of the position of the first reference image portion and acquires a position of a second reference image portion in each of the plurality of second captured images by analyzing the plurality of second captured images and performs registration on the plurality of second captured images on the basis of the position of the second reference image portion.

According to the present embodiment, registration of the plurality of first captured images and registration of the plurality of second captured images can be performed without acquiring the focal length of the first optical system and the focal length of the second optical system.

Desirably, the image compositing unit composites the plurality of first captured images by adding data of the registered plurality of first captured images and calculating the average of the data after addition and composites the plurality of second captured images by adding data of the registered plurality of second captured images and calculating the average of the data after addition.

According to the present embodiment, compositing of the plurality of first captured images and compositing of the plurality of second captured images can be performed by arithmetic mean calculation processing.

Desirably, the image compositing unit composites the plurality of first captured images by calculating the weighted mean of data of the plurality of first captured images on the basis of a weight that is determined in accordance with the state of the optical axis of the first optical system at the time of imaging, and composites the plurality of second captured images by calculating the weighted mean of data of the plurality of second captured images on the basis of a weight that is determined in accordance with the state of the optical axis of the second optical system at the time of imaging.

According to the present embodiment, compositing of the plurality of first captured images and compositing of the plurality of second captured images can be performed by weighted mean calculation processing.

Desirably, the weight that is determined in accordance with the state of the optical axis of the first optical system is determined by a Gaussian distribution based on the state of the optical axis of the first optical system, and the weight that is determined in accordance with the state of the optical axis of the second optical system is determined by a Gaussian distribution based on the state of the optical axis of the second optical system.

According to the present embodiment, compositing of the plurality of first captured images and compositing of the plurality of second captured images can be performed by weighted mean calculation processing that uses the weight determined by a Gaussian distribution based on the state of the optical axis, and the crosstalk images in the first generated image and in the second generated image can be smoothly blurred.

Desirably, the plurality of first captured images is more densely imaged as the optical axis of the first optical system is closer to a reference state, is more sparsely imaged as the optical axis of the first optical system is more away from the reference state, and is output from the first sensor group, and the plurality of second captured images is more densely imaged as the optical axis of the second optical system is closer to a reference state, is more sparsely imaged as the optical axis of the second optical system is more away from the reference state, and is output from the second sensor group.

According to the present embodiment, a distribution density of the plurality of first captured images is changed in accordance with the relationship between the state of the optical axis of the first optical system and the reference state, and the crosstalk image in the first generated image can be effectively blurred. Similarly, a distribution density of the plurality of second captured images is changed in accordance with the relationship between the state of the optical axis of the second optical system and the reference state, and the crosstalk image in the second generated image can be effectively blurred.

Desirably, a distribution density of the state of the optical axis of the first optical system at the time of capturing the plurality of first captured images is determined on the basis of a Gaussian distribution, and a distribution density of the state of the optical axis of the second optical system at the time of capturing the plurality of second captured images is determined on the basis of a Gaussian distribution.

According to the present embodiment, since the distribution density of the state of the optical axis is determined on the basis of a Gaussian distribution, the crosstalk image in the first generated image and in the second generated image can be smoothly blurred.

Desirably, the image generating unit further has an image correcting unit that performs correction of the first captured image and the second captured image, reduces influence of light passing the second optical system in the first captured image, and reduces influence of light passing the first optical system in the second captured image.

According to the present embodiment, influence of light passing the second optical system is reduced in the first captured image, and influence of light passing the first optical system is reduced in the second captured image. Thus, the first generated image and the second generated image in which the crosstalk images are effectively reduced can be generated.

Desirably, the image correcting unit performs the correction on the basis of an inverse matrix of a matrix that is configured of a detected gain distribution and a crosstalk gain distribution of the first captured image and the second captured image.

According to the present embodiment, calculation processing using a matrix can facilitate reduction of influence of light passing the second optical system in the first captured image and reduction of influence of light passing the first optical system in the second captured image.

Desirably, the image correcting unit, furthermore, corrects the first captured image to reduce influence of an aberration of the first optical system and corrects the second captured image to reduce influence of an aberration of the second optical system.

According to the present embodiment, influence of an aberration in the first captured image and in the second captured image is reduced, and the image quality of the first generated image and the second generated image can be improved.

Desirably, the plurality of first captured images is captured in one-dimensionally different states of the optical axis of the first optical system and output from the first sensor group, and the plurality of second captured images is captured in one-dimensionally different states of the optical axis of the second optical system and output from the second sensor group.

According to the present embodiment, the plurality of first captured images is captured in one-dimensionally different states of the optical axis of the first optical system, and the plurality of second captured images is captured in one-dimensionally different states of the optical axis of the second optical system. "One-dimensionally different states of the optical axis" can be realized by, for example, changing the direction (angle) of the optical axis or the relative position of the optical axis with respect to the subject in a straight line.

Desirably, the plurality of first captured images is captured in two-dimensionally different states of the optical axis of the first optical system and output from the first sensor group, and the plurality of second captured images is captured in two-dimensionally different states of the optical axis of the second optical system and output from the second sensor group.

According to the present embodiment, the plurality of first captured images is captured in two-dimensionally different states of the optical axis of the first optical system, and the plurality of second captured images is captured in two-dimensionally different states of the optical axis of the second optical system. "Two-dimensionally different states of the optical axis" can be realized by, for example, changing the direction (angle) of the optical axis or the relative position of the optical axis with respect to the subject in a plane.

Desirably, the imaging device further comprises an optical system actuator that changes the states of the optical axes of the first optical system and the second optical system by moving the imaging optical system.

According to the present embodiment, the state of the optical axis of the first optical system and the second optical system can be actively changed by the optical system actuator.

Desirably, the optical system actuator is a pan and tilt device that pans and tilts the imaging optical system.

According to the present embodiment, the state (particularly, the direction) of the optical axis of the first optical system and the second optical system can be simply changed by the pan and tilt device.

Desirably, the imaging device further comprises a subject holding unit that holds a subject and a subject actuator that moves the subject holding unit.

According to the present embodiment, the state of the optical axis of the first optical system and the second optical system with respect to the subject can be changed by moving the subject.

Another embodiment of the present invention relates to an imaging method in an imaging device including an imaging optical system that includes a first optical system and a second optical system having a common optical axis and having different focal lengths, an imaging element that includes a first sensor group selectively receiving light passing the first optical system and a second sensor group selectively receiving light passing the second optical system, and an image generating unit that generates a first generated image on the basis of a first captured image output from the first sensor group and generates a second generated image on the basis of a second captured image output from the second sensor group, the method comprising, in the image generating unit, a step of performing registration on a plurality of the first captured images captured in different states of the optical axis of the first optical system, a step of generating the first generated image by compositing the registrated plurality of first captured images, a step of performing registration on a plurality of the second captured images captured in different states of the optical axis of the second optical system, and a step of generating the second generated image by compositing the registrated plurality of second captured images.

Still another embodiment of the present invention relates to a non-transitory computer readable recording medium storing a program that causes a computer to execute procedures of an imaging method in an imaging device including an imaging optical system that includes a first optical system and a second optical system having a common optical axis and having different focal lengths, an imaging element that includes a first sensor group selectively receiving light passing the first optical system and a second sensor group selectively receiving light passing the second optical system, and an image generating unit that generates a first generated image on the basis of a first captured image output from the first sensor group and generates a second generated image on the basis of a second captured image output from the second sensor group, the procedures comprising, in the image generating unit, a procedure of performing registration on a plurality of the first captured images captured in different states of the optical axis of the first optical system, a procedure of generating the first generated image by compositing the registrated plurality of first captured images, a procedure of performing registration on a plurality of the second captured images captured in different states of the optical axis of the second optical system, and a procedure of generating the second generated image by compositing the registrated plurality of second captured images.

According to the present invention, the first generated image is generated by compositing the registrated plurality of first captured images, influence of the crosstalk image made by light passing the second optical system is weakened in the first generated image, and the clearness of the desired image made by light passing the first optical system can be made favorable. In addition, according to the present invention, the second generated image is generated by compositing the registrated plurality of second captured images, influence of the crosstalk image made by light passing the first optical system is weakened in the second generated image, and the clearness of the desired image made by light passing the second optical system can be made favorable. Accordingly, since the first generated image is generated from the first captured image and the second generated image is generated from the second captured image by image processing, an image of high quality can be acquired by reducing influence of interference of imaging light between optical systems with a simple process configuration without requiring addition of special hardware.

BRIEF DESCRIPTION OF THE DRAWINGS

FIG. 15A illustrates a "signal (image data)" that has a luminance distribution according to positions. FIG. 15B illustrates a "distribution of shift compositing (convolution kernel)" that defines weights according to positions. FIG. 15C illustrates the result of calculation of convolution of the distribution of shift compositing illustrated in FIG. 15B to the signal illustrated in FIG. 15A.

FIG. 17A is a diagram for describing an example of disposing a difference in density in the strength distribution based on positions. FIG. 17B is a diagram for describing an example of setting the difference in density in accordance with the Gaussian distribution.

FIG. 18 is a diagram for describing the amount of shift of a telescopic image by a pan operation. (c) of FIG. 18 illustrates a second captured image (telescopic image) that is captured in a first pan position. (b) of FIG. 18 illustrates the second captured image (telescopic image) that is captured in a second pan position.

FIG. 19 is a diagram for describing the amount of shift of a wide-angle image by a pan operation. (c) of FIG. 19 illustrates a first captured image (wide-angle image) that is captured in the first pan position. (b) of FIG. 19 illustrates the first captured image (wide-angle image) that is captured in the second pan position.

FIG. 20 is a diagram for describing the amount of shift of the telescopic image (desired image) that includes a crosstalk image (wide-angle image). (c) of FIG. 20 illustrates the second captured image (telescopic image) that is captured in the first pan position. (b) of FIG. 20 illustrates the second captured image (telescopic image) that is captured in the second pan position.

FIG. 21 is a diagram for describing the amount of shift of the wide-angle image (desired image) that includes a crosstalk image (telescopic image). (c) of FIG. 21 illustrates the first captured image (wide-angle image) that is captured in the first pan position. (b) of FIG. 21 illustrates the first captured image (wide-angle image) that is captured in the second pan position.

FIG. 23A illustrates a plurality of captured images (telescopic images). FIG. 23B illustrates one example of a telescopic image that is generated by registration and compositing of the plurality of captured images.

FIG. 24A illustrates a plurality of captured images (wide-angle images). FIG. 24B illustrates one example of a wide-angle image that is generated by registration and compositing of the plurality of captured images.

FIG. 30 illustrates a determinant that is represented by simplifying the determinant in FIG. 29.

FIG. 31 illustrates elements constituting "W1" illustrated in FIG. 30.

FIG. 32 illustrates a calculation formula of "w1_ij" derived on the basis of the determinant illustrated in FIG. 30.

FIG. 33 illustrates a calculation formula of "t1_ij" derived on the basis of the determinant illustrated in FIG. 30.

FIG. 34A illustrates a wide-angle image example, and FIG. 34B illustrates a telescopic image example.

FIG. 35A illustrates a wide-angle image example, and FIG. 35B illustrates a telescopic image example.

Figure 36:
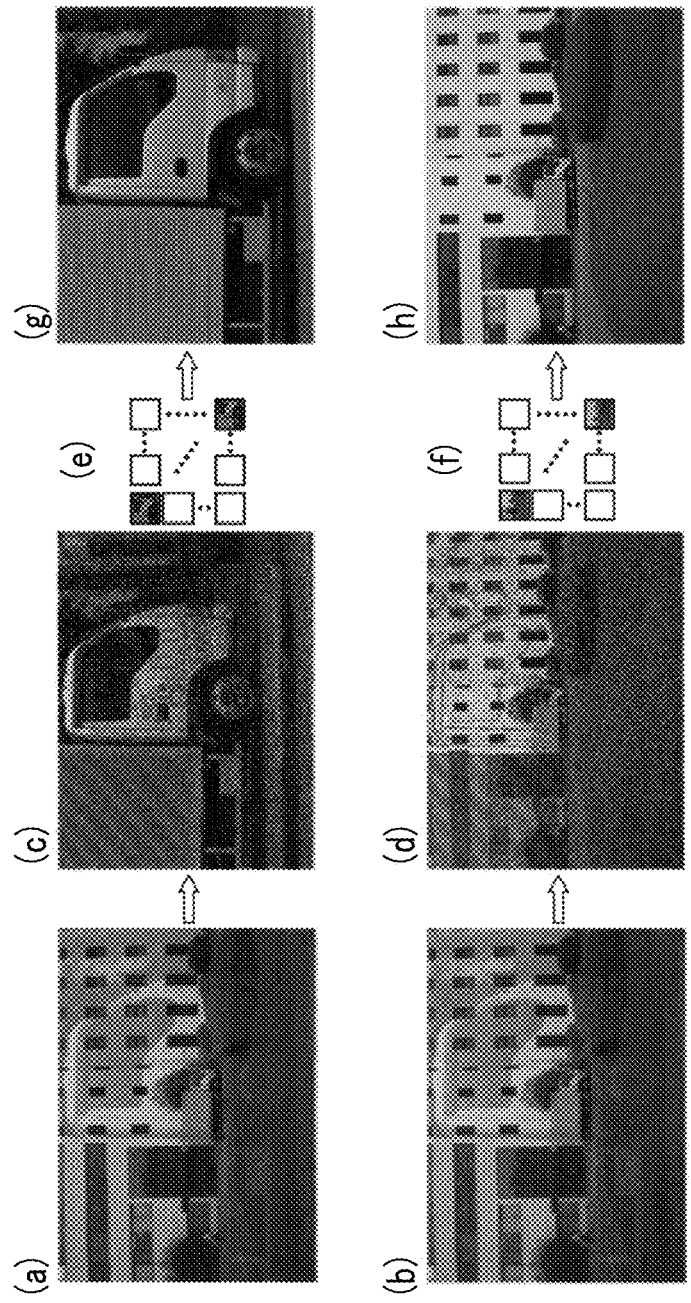
FIG. 36 illustrates another image examples in the case of performing the "post-registration compositing processing" according to the first embodiment after performing "the correction processing based on the inverse matrix of the matrix configured of the detected gain distribution and the crosstalk gain distribution". (c) of FIG. 36 illustrates one example of a telescopic captured image (second captured image data D12) that is output from the imaging element 24 (second sensor group 24b). (b) of FIG. 36 illustrates one example of a wide-angle captured image (first captured image data D11) that is output from the imaging element 24

(first sensor group 24c). (c) of FIG. 36 illustrates a telescopic image (second captured image data D12) that is acquired by applying "the correction processing based on the inverse matrix $M^{-1}$ of the matrix M configured of the detected gain distribution and the crosstalk gain distribution (refer to FIG. 28 to FIG. 33)" to the telescopic captured image illustrated in (c) of FIG. 36. (d) of FIG. 36 illustrates a wide-angle image (first captured image data D11) that is acquired by applying "the correction processing based on the inverse matrix $M^{-1}$ of the matrix M configured of the detected gain distribution and the crosstalk gain distribution (refer to FIG. 28 to FIG. 33)" to the wide-angle captured image illustrated in (b) of FIG. 36. (e) of FIG. 36 is a plurality of telescopic captured images (second captured image data D12) acquired by two-dimensionally changing the state of the optical axis L of the second optical system 22 and illustrates a plurality of telescopic captured images (refer to (c) of FIG. 36) after "the correction processing based on the inverse matrix $M^{-1}$ of the matrix M configured of the detected gain distribution and the crosstalk gain distribution (refer to FIG. 28 to FIG. 33)" is applied. (f) of FIG. 36 is a plurality of wide-angle captured images (first captured image data D11) acquired by two-dimensionally changing the state of the optical axis L of the first optical system 21 and illustrates a plurality of wide-angle captured images (refer to (d) of FIG. 36) after "the correction processing based on the inverse matrix $M^{-1}$ of the matrix M configured of the detected gain distribution and the crosstalk gain distribution (refer to FIG. 28 to FIG. 33)" is applied. (g) of FIG. 36 illustrates a telescopic generated image (second generated image data D22) that is acquired by performing "registration processing and compositing processing (refer to FIGS. 23A and 23B)" for the plurality of telescopic captured images (second captured image data D12) illustrated in (e) of FIG. 36. (h) of FIG. 36 illustrates a wide-angle generated image (first generated image data D21) that is acquired by performing "registration processing and compositing processing (refer to FIGS. 24A and 24B)" for the plurality of wide-angle captured images (first captured image data D11) illustrated in (f) of FIG. 36.

Figure 37:
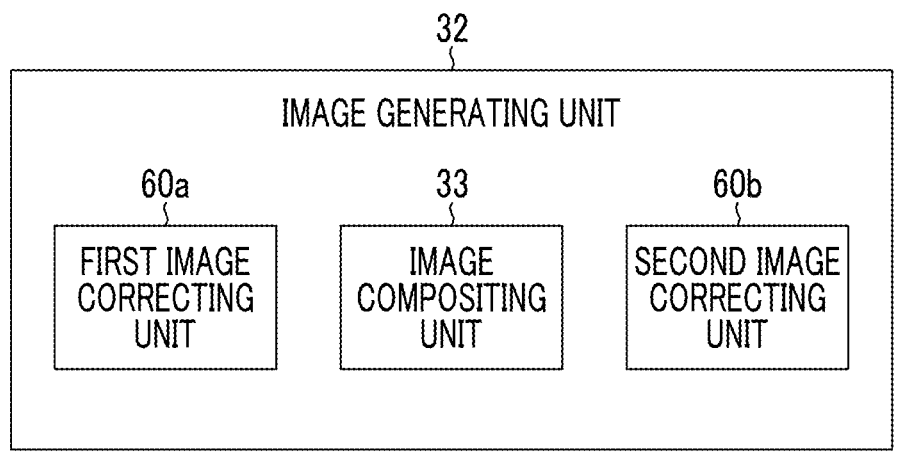

FIG. 37 is a block diagram illustrating one modification example of the functional configuration of the image generating unit.

Figure 38:
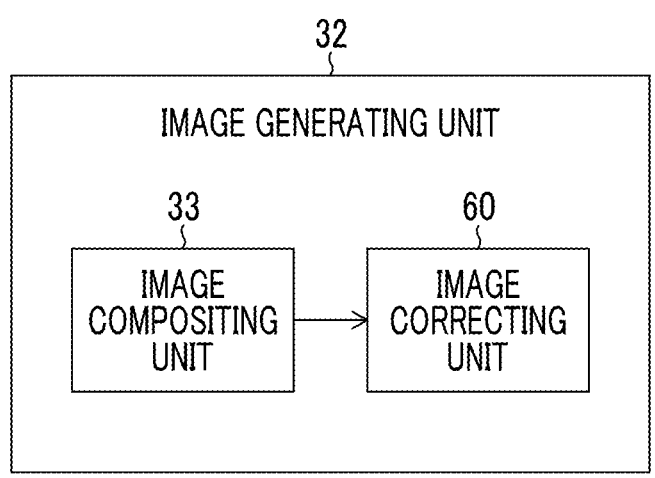

FIG. 38 is a block diagram illustrating another modification example of the functional configuration of the image generating unit.

Figure 39:
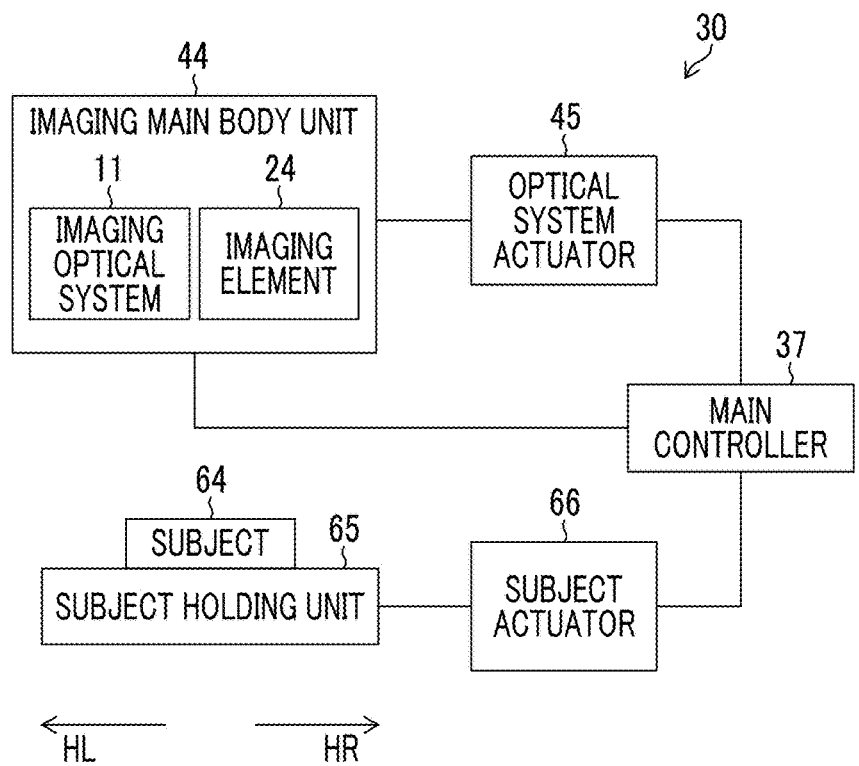

FIG. 39 is a block diagram illustrating an imaging device according to a third embodiment.

Figure 40:
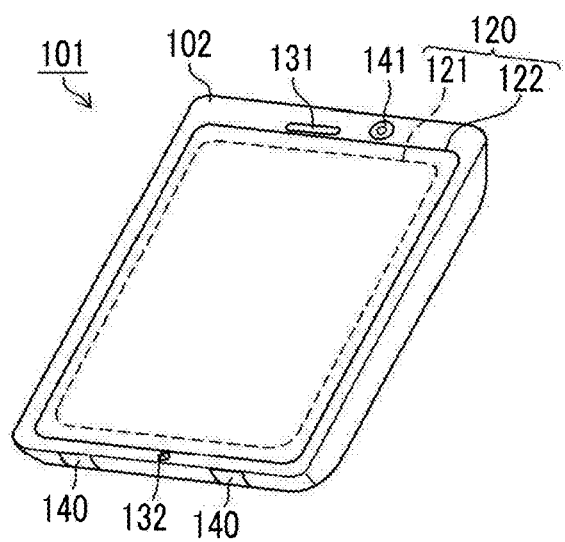

FIG. 40 is a diagram illustrating the exterior of a smartphone that is one embodiment of the imaging device of the present invention.

Figure 41:
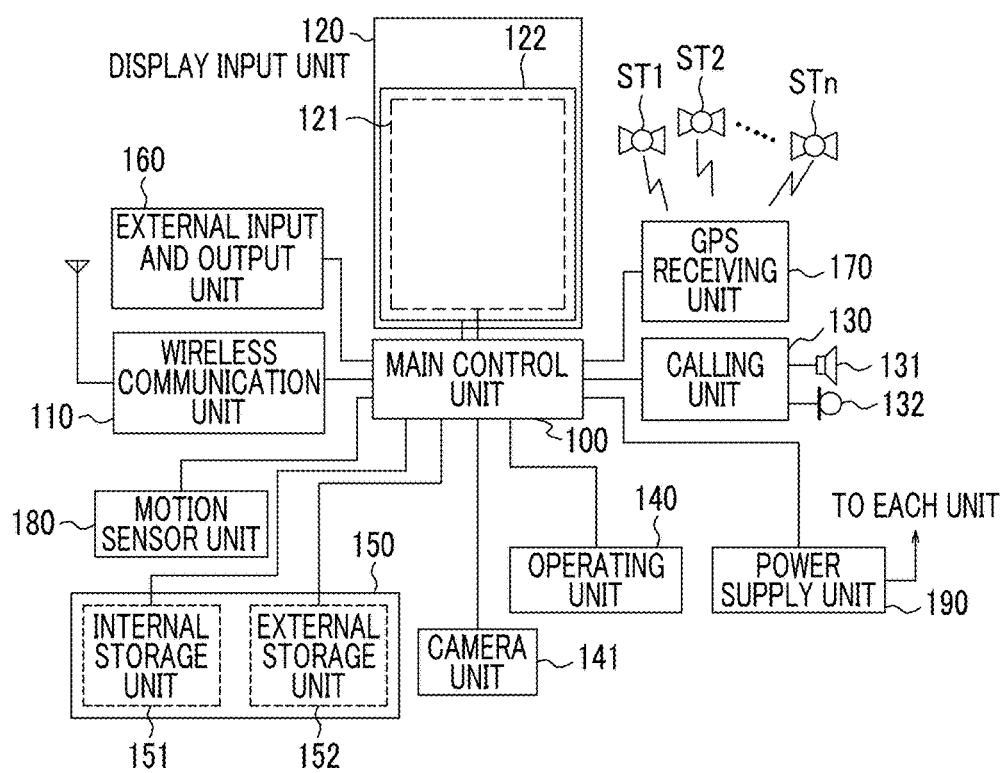

FIG. 41 is a block diagram illustrating a configuration of the smartphone illustrated in FIG. 40.

DESCRIPTION OF THE PREFERRED EMBODIMENTS

Hereinafter, embodiments of the present invention will be described with reference to the drawings.

The present invention can be widely applied to an imaging device, an imaging method, an imaging procedure, and an application technology thereof that can image a plurality of types of images with use of an imaging optical system having a plurality of types of optical properties. The field of technology to which the present invention can be applied is not particularly limited. For example, the present invention can be applied to not only an imaging device performing imaging in response to a user operation but also an imaging device automatically performing imaging. In addition, the present invention can be applied to not only an imaging device imaging a still picture but also an imaging device imaging a motion picture.

Figure 1:
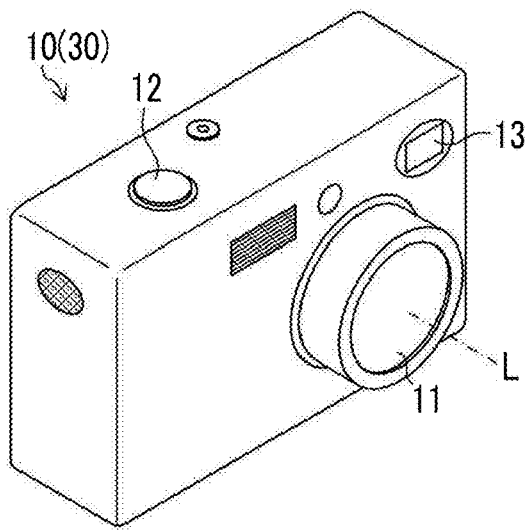
FIG. 1 is a perspective view illustrating one example of a digital camera (imaging device) to which the present invention can be applied.

FIG. 1 is a perspective view illustrating one example of a digital camera 10 (imaging device 30) to which the present invention can be applied. In the example illustrated in FIG. 1, an imaging optical system 11, a flash 13, and the like are disposed on the front surface of a camera main body of the digital camera 10, and a release button 12 and the like are disposed on the upper surface of the camera main body. The reference sign "L" in FIG. 1 represents the optical axis of the imaging optical system 11.

Figure 2:
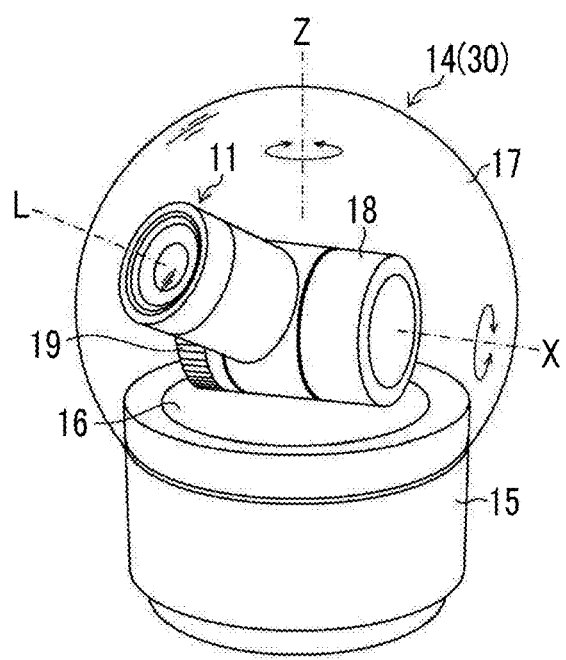
FIG. 2 is a perspective view illustrating one example of an automatic tracking imaging device (imaging device) to which the present invention can be applied.

FIG. 2 is a perspective view illustrating one example of an automatic tracking imaging device 14 (imaging device 30) to which the present invention can be applied. In the automatic tracking imaging device 14 illustrated in FIG. 2, a holding unit 18 that includes a gear 19 and the imaging optical system 11 that is attached to the holding unit 18 are fixedly installed on a pedestal 16 that is disposed on a device main body 15. The pedestal 16 is disposed to be rotatable with the axis of a perpendicular direction Z of the device main body 15 as a center, and a pan operation with the axis of the perpendicular direction Z as a center is performed by a pan driving unit not illustrated. The gear 19 is disposed on the same axis as the axis of a horizontal direction X. A driving force is delivered from a tilt driving unit, not illustrated, through the gear 19 to pivot the imaging optical system 11 in the up-down direction, and thereby a tilt operation is performed. The imaging optical system 11, the holding unit 18 (gear 19), and the pedestal 16 are covered with a dustproof and rainproof dome cover 17.

Each embodiment and each modification example of the present invention described below, for example, may be applied to the digital camera 10 illustrated in FIG. 1 or may be applied to the automatic tracking imaging device 14 illustrated in FIG. 2.

First Embodiment

Figure 3:
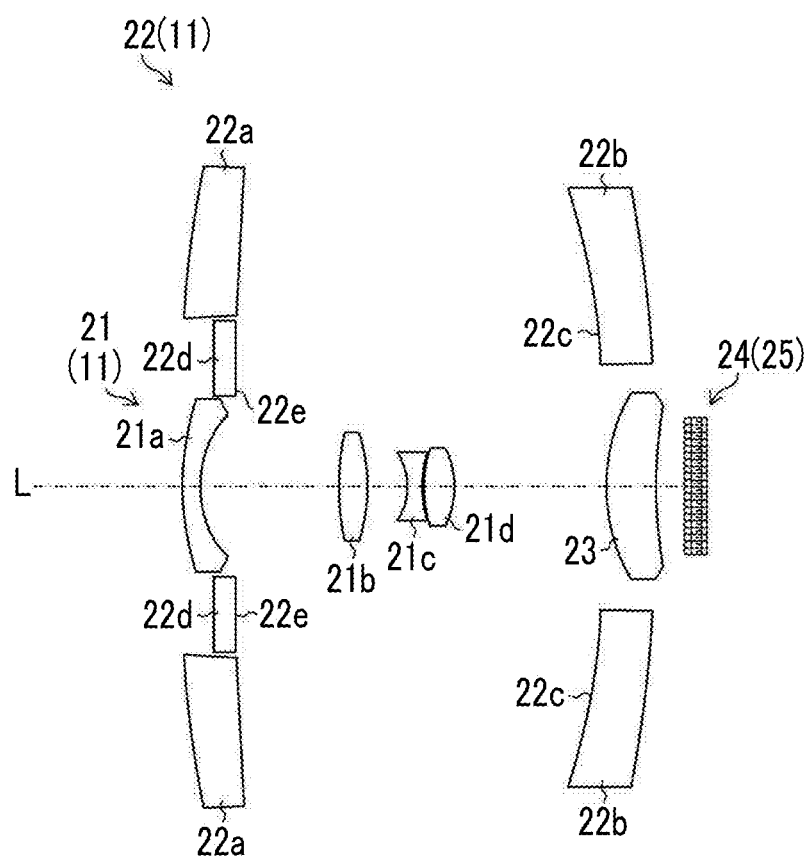
FIG. 3 is a diagram illustrating cross-sectional configurations of an imaging optical system and an imaging element according to a first embodiment.

FIG. 3 is a diagram illustrating cross-sectional configurations of the imaging optical system 11 and an imaging element 24 according to a first embodiment.

The imaging optical system 11 includes a first optical system 21 and a second optical system 22 each of which has an independent property. Particularly, in the present embodiment, the first optical system 21 and the second optical system 22 are configured of optical systems having different focal lengths. That is, the imaging optical system 11 of the present embodiment includes the first optical system 21 configured of a "wide-angle image imaging lens group" and the second optical system 22 configured of a "telescopic image imaging lens group", and a wide-angle image and a telescopic image are captured at the same time by the imaging element 24.

The first optical system 21 illustrated in FIG. 3 includes a first wide-angle lens 21a, a second wide-angle lens 21b, a third wide-angle lens 21c, a fourth wide-angle lens 21d, and a common lens 23 that are arranged on a same optical axis L. The second optical system 22 includes a first telescopic lens 22a, a first telescopic reflector 22b in which a first telescopic reflective mirror 22c is disposed, a second telescopic reflector 22d in which a second telescopic reflective mirror 22e is disposed, and the common lens 23. The first optical system 21 of the present example (particularly, the first wide-angle lens 21a, the second wide-angle lens 21b, the third wide-angle lens 21c, and the fourth wide-angle lens 21*d*) forms a central optical system. The second optical system 22 of the present example (particularly, the first telescopic lens 22*a*, the first telescopic reflector 22*b*, the first telescopic reflective mirror 22*c*, the second telescopic reflector 22*d*, and the second telescopic reflective mirror 22*e*) is disposed around the central optical system formed by the first optical system 21 and forms concentric circles with the central optical system formed by the first optical system 21. The common lens 23 is arranged on the optical axis L and is shared between the first optical system 21 and the second optical system 22.

Accordingly, the imaging optical system 11 of the present example includes the first optical system 21 and the second optical system 22 that have the common optical axis L and have different focal lengths.

The imaging element 24 is configured to have a plurality of light receiving sensors 25 that is two-dimensionally arranged with respect to a direction Ruining a perpendicular with the optical axis L. Particularly, the imaging element 24 of the present embodiment constitutes a directional sensor that can receive wide-angle image light of irradiation through the first optical system 21 and telescopic image light of irradiation through the second optical system 22 at the same time and that can output an imaging signal for generating a wide-angle image (first captured image) and an imaging signal for generating a telescopic image (second captured image). That is, the imaging element 24 of the present embodiment has the plurality of light receiving sensors 25 that is disposed in correspondence with each of the first optical system 21 and the second optical system 22 and that selectively receives light passing a corresponding optical system of the first optical system 21 and the second optical system 22 by pupil division of the light.

Figure 4:
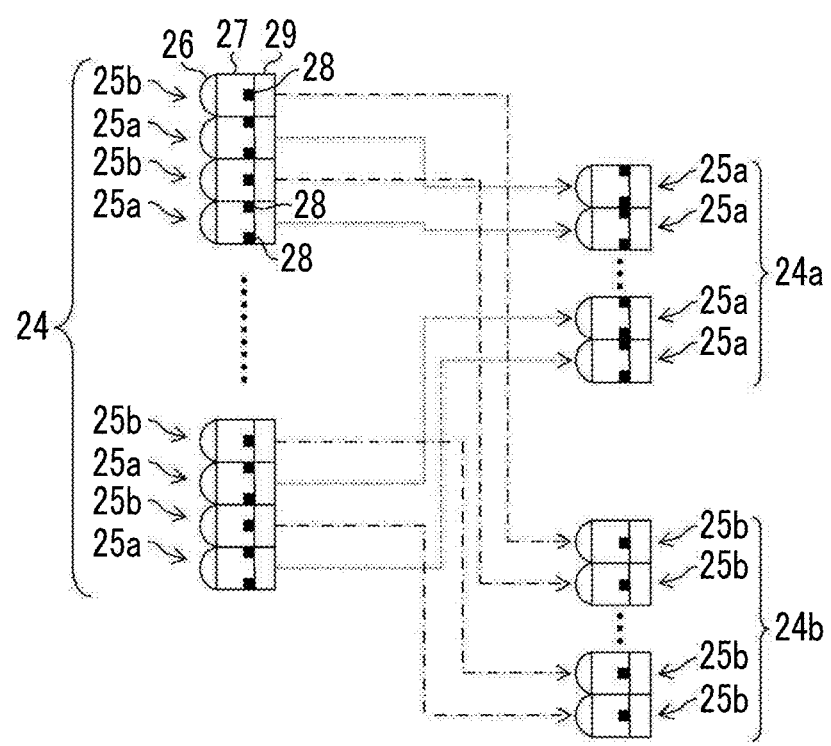
FIG. 4 is a diagram illustrating a detailed cross-sectional configuration example of the imaging element illustrated in FIG. 3.

FIG. 4 is a diagram illustrating a detailed cross-sectional configuration example of the imaging element 24 illustrated in FIG. 3.

The plurality of light receiving sensors 25 constituting the imaging element 24 of the present example includes a "first light receiving sensor 25*a* for wide-angle image" corresponding to the first optical system 21 and a "second light receiving sensor 25*b* for telescopic image" corresponding to the second optical system 22. The first light receiving sensor 25*a* and the second light receiving sensor 25*b* are two-dimensionally alternately arranged. A plurality of the first light receiving sensors 25*a* included in the imaging element 24 constitutes "a first sensor group 24*a* that selectively receives light passing the first optical system 21" and outputs an imaging signal for generating a wide-angle image. A plurality of the second light receiving sensors 25*b* included in the imaging element 24 constitutes "a second sensor group 24*b* that selectively receives light passing the second optical system 22" and outputs an imaging signal for generating a telescopic image. Accordingly, the imaging element 24 of the present example includes the first sensor group 24*a* corresponding to the first optical system 21 and the second sensor group 24*b* corresponding to the second optical system 22.

Each of the first light receiving sensor 25*a* and the second light receiving sensor 25*b* has a microlens 26, a photodiode 29, and an interlayer 27 in which the microlens 26 and the photodiode 29 are arranged. A light shielding mask 28 is disposed in the interlayer 27. The light shielding mask 28 is arranged in a peripheral portion of a light receiving surface of the photodiode 29 in the first light receiving sensor 25*a*. The light shielding mask 28 is arranged in a central portion of the light receiving surface of the photodiode 29 in the second light receiving sensor 25*b*. The arrangement of the light shielding mask 28 is determined in correspondence with any of the first optical system 21 and the second optical system 22. Each light shielding mask 28 blocks light from a non-corresponding optical system and causes light from a corresponding optical system to be received by the photodiode 29 without blocking the light.

While, in the present example, the light receiving sensor 25 including the light shielding mask 28 realizes a plurality of light receiving sensors that selectively receives light passing a corresponding optical system of the first optical system 21 and the second optical system 22 by pupil division of the light, pupil division may be realized by another means. For example, the light shielding mask 28 may be disposed in a stage before the microlens 26 (for example, between the microlens 26 and the common lens 23 (refer to FIG. 3)), or light shielding means (for example, a liquid crystal shutter) other than the light shielding mask 28 may be used.

A member other than the light shielding mask 28 may be disposed in the interlayer 27. For example, color filters of RGB (red, green, and blue) or the like, interconnects, and circuits may be disposed in the interlayer 27.

Figure 5:
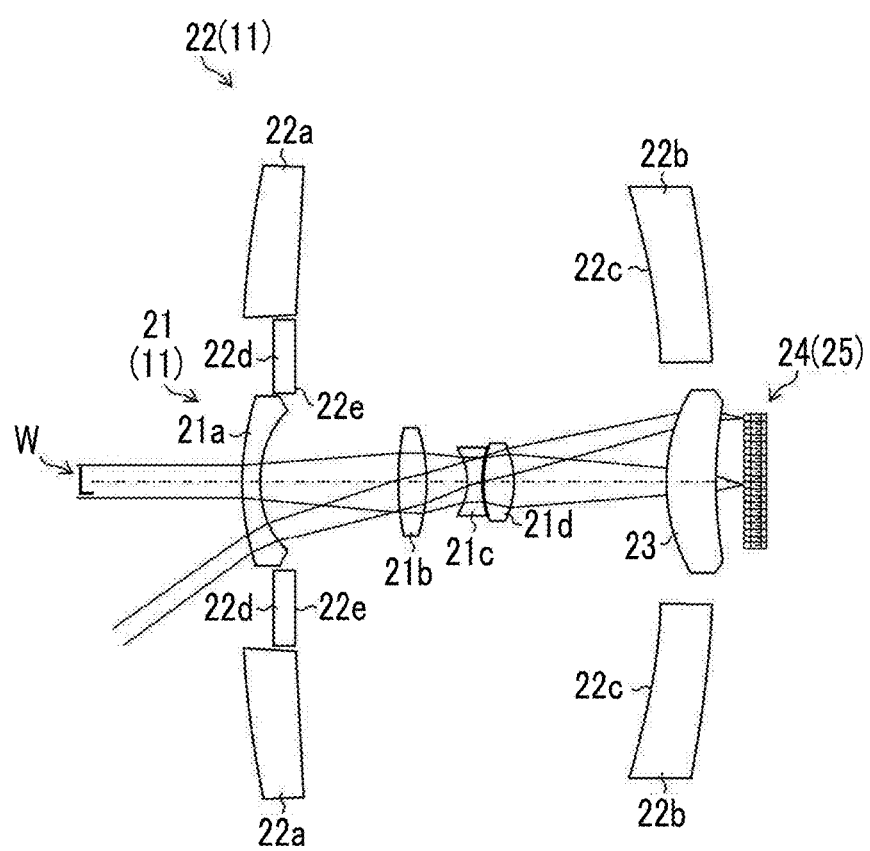
FIG. 5 is a diagram illustrating the optical path of wide-angle image light that is incident on the imaging optical system (particularly, a first optical system) and on the imaging element (particularly, a first sensor group (refer to FIG. 4)) illustrated in FIG. 3.

FIG. 5 is a diagram illustrating the optical path of wide-angle image light W that is incident on the imaging optical system 11 (particularly, the first optical system 21) and on the imaging element 24 (particularly, the first sensor group 24*a* (refer to FIG. 4)) illustrated in FIG. 3. The wide-angle image light W in the present embodiment passes the first wide-angle lens 21*a*, the second wide-angle lens 21*b*, the third wide-angle lens 21*c*, the fourth wide-angle lens 21*d*, and the common lens 23 of the first optical system 21 in order, and a wide-angle image is formed on the imaging element 24.

Figure 6:
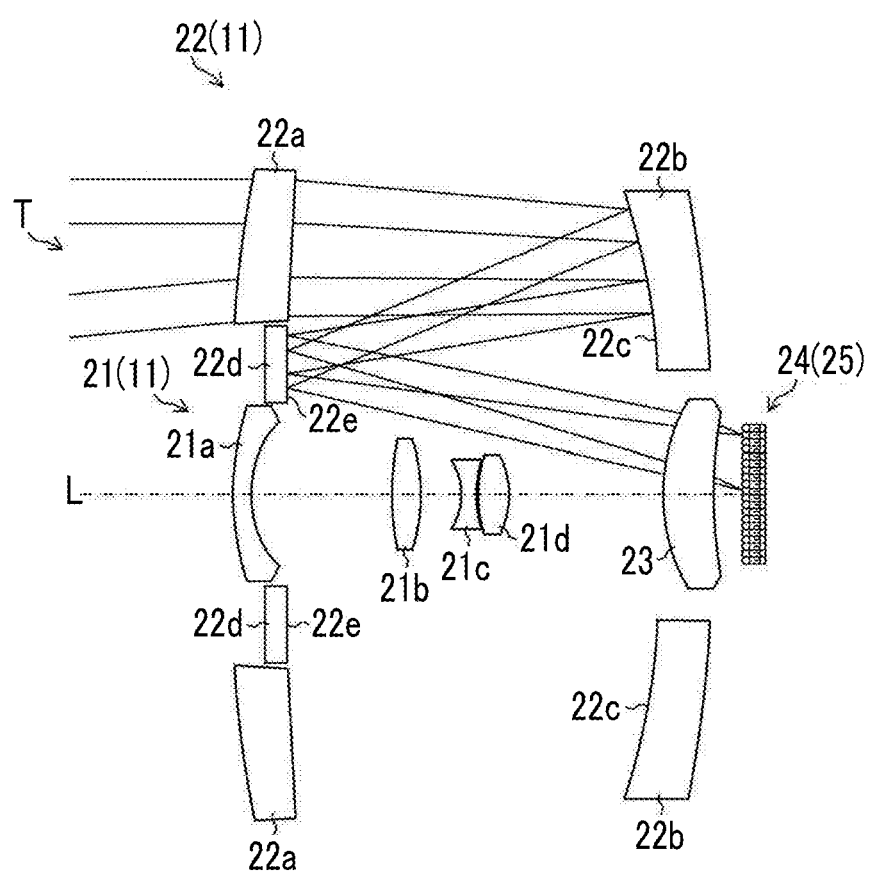
FIG. 6 is a diagram illustrating the optical path of telescopic image light that is incident on the imaging optical system (particularly, a second optical system) and on the imaging element (particularly, a second sensor group (refer to FIG. 4)) illustrated in FIG. 3.

FIG. 6 is a diagram illustrating the optical path of telescopic image light T that is incident on the imaging optical system 11 (particularly, the second optical system 22) and on the imaging element 24 (particularly, the second sensor group 24*b* (refer to FIG. 4)) illustrated in FIG. 3. The telescopic image light T in the present embodiment passes (is transmitted by) the first telescopic lens 22*a*, is reflected by each of the first telescopic reflective minor 22*c* and the second telescopic reflective minor 22*e*, then passes the common lens 23, and a telescopic image is formed on the imaging element 24. Accordingly, the optical path being folded by reflection by each of the first telescopic reflective minor 22*c* and the second telescopic reflective mirror 22*e* can decrease the length in the direction of the optical axis L of the second optical system 22 that is for capturing of a telescopic image and has a long focal length.

Next, degradation of image quality that may be caused in the wide-angle image (first captured image) and in the telescopic image (second captured image) acquired by the above imaging optical system 11 and the imaging element 24 will be described.

In the imaging optical system 11 and the imaging element 24, in the case of having insufficient performance of pupil division of wide-angle image light reaching the imaging element 24 by passing the first optical system 21 and telescopic image light reaching the imaging element 24 by passing the second optical system 22, an image in which the wide-angle image and the telescopic image are mixed in an overlaying manner is acquired due to insufficient separation of the wide-angle image light and the telescopic image light. That is, if the telescopic image light filters into the first sensor group 24*a* (the photodiode 29 of the first light receiving sensor 25*a* (refer to FIG. 4)) that is intended to receive only the wide-angle image light, a wide-angle image that is overlaid by a part of a telescopic image component is acquired. Similarly, if the wide-angle image light filters into the second sensor group 24b (the photodiode 29 of the second light receiving sensor 25b (refer to FIG. 4)) that is intended to receive only the telescopic image light, a telescopic image that is overlaid by a part of a wide-angle image component is acquired.

Accordingly, if interference exists between imaging light (wide-angle image light) passing the first optical system 21 and imaging light (telescopic image light) passing the second optical system 22, a signal of an image component that is not supposed to be separated and received is mixed into output of each light receiving sensor 25 constituting the imaging element 24.

The inventor of the present invention, as a result of through researches in view of the above matters, focuses on a difference in change of an image position between the wide-angle image and the telescopic image in the case of the imaging device 30 (imaging optical system 11) relatively moving with respect to a subject, and finds a new method for acquiring both a high-quality wide-angle image and a high-quality telescopic image by performing image processing with use of the difference in change of the image position.

For example, in the imaging optical system 11 illustrated in FIG. 3, the first optical system 21 used in capturing of the wide-angle image and the second optical system 22 used in capturing of the telescopic image have the common optical axis L, and the image center of the wide-angle image is the same as the image center of the telescopic image. In the case of imaging the same subject as the wide-angle image and the telescopic image with use of the first optical system 21 and the second optical system 22, a subject image (telescopic image) that passes the second optical system 22 has a greater size of an image on the imaging element 24 than a subject image (wide-angle image) that passes the first optical system 21. Accordingly, in the case of imaging the same subject as the wide-angle image and the telescopic image, the subject image in the telescopic image is larger than the subject image in the wide-angle image. Thus, with respect to the image position in the case of change in the state of the optical axis L of the first optical system 21 and the second optical system 22 due to a pan, a tilt, or the like, the amount of change is relatively small in the wide-angle image, and the amount of change is relatively large in the telescopic image.

The ratio in the size of the subject image between the wide-angle image and the telescopic image approximately matches the ratio of the focal length of a wide-angle lens (first optical system 21) and the focal length of a telescopic lens (second optical system 22) with another influence such as an aberration not considered. For example, given that "k" represents a constant, that "fw" represents the focal length of the wide-angle lens (first optical system 21), that "ft" represents the focal length of the telescopic lens (second optical system 22), that "θ" represents the angle of a pan of the imaging device 30 including the imaging optical system 11, that "Sw" represents the amount of movement an image passing the wide-angle lens (first optical system 21) makes on the imaging element 24 (first sensor group 24c), and that "St" represents the amount of movement an image passing the telescopic lens (second optical system 22) makes on the imaging element 24 (second sensor group 24b), Expression (1) and Expression (2) below are established.

$$Sw = k \cdot fw \cdot \tan(\theta) \quad (1)$$

$$St = k \cdot ft \cdot \tan(\theta) \quad (2)$$

Even if crosstalk occurs due to interference of imaging light between the first optical system 21 and the second optical system 22, the amount of movement of the image position in the case of change in the state of the optical axis L of the first optical system 21 and the second optical system 22 due to a pan, a tilt, or the like differs between the wide-angle image and the telescopic image. Thus, a shift occurs in a positional relationship between an intended desired image and an unintended crosstalk image before or after change in the state of the optical axis L of the first optical system 21 and the second optical system 22.

The inventor of the present invention finds a new method that can significantly reduce influence of a component of the crosstalk image in each of the wide-angle image and the telescopic image and that can very effectively prevent degradation of visibility of the wide-angle image and the telescopic image by using "the shift in the positional relationship between the desired image and the crosstalk image before or after change of the optical axis L".

Figure 7:
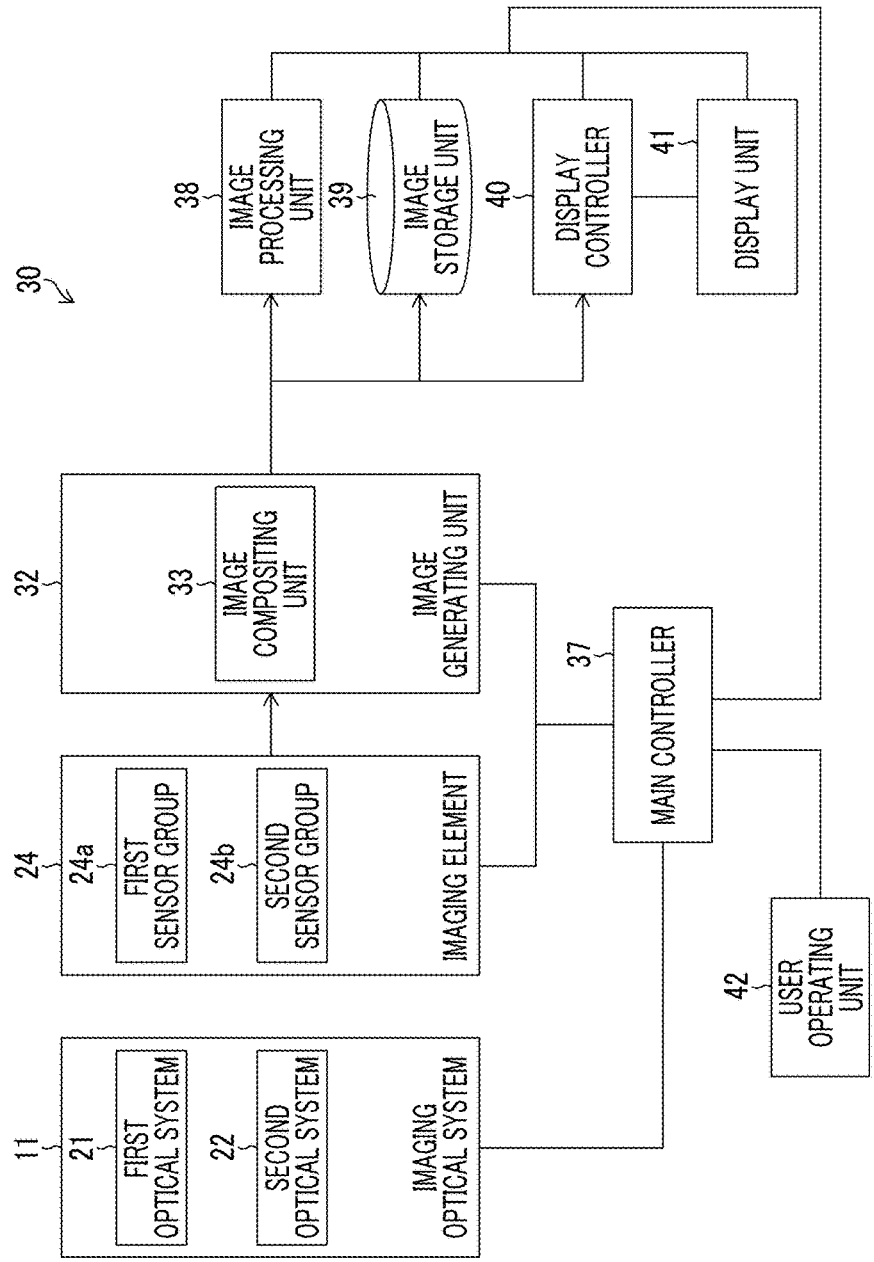
FIG. 7 is a block diagram illustrating a functional configuration example of the imaging device according to the first embodiment.

FIG. 7 is a block diagram illustrating a functional configuration example of the imaging device 30 according to the first embodiment.

The imaging device 30 of the present example has an image generating unit 32 (image compositing unit 33), a main controller 37, an image processing unit 38, an image storage unit 39, a display controller 40, a display unit 41, and a user operating unit 42 in addition to the imaging optical system 11 (the first optical system 21 and the second optical system 22) and the imaging element 24 (the first sensor group 24a and the second sensor group 24b) above. The image generating unit 32 (image compositing unit 33), the main controller 37, and the image processing unit 38 by, for example, one or a plurality of microprocessors executing various types of software stored in a storage unit not illustrated.

The image generating unit 32 generates first generated image data D21 on the basis of first captured image data D11 output from the first sensor group 24a and generates second generated image data D22 on the basis of second captured image data D12 output from the second sensor group 24b. The image generating unit 32 of the present example has the image compositing unit 33 and generates generated image data by the image compositing unit 33 compositing a plurality of captured images. That is, the image compositing unit 33 performs registration on a plurality of pieces of the first captured image data D11 that is captured in different states of the optical axis L of the first optical system 21, and composites the registrated plurality of pieces of first captured image data D11 to generate the first generated image data D21. Similarly, the image compositing unit 33 performs registration on a plurality of pieces of the second captured image data D12 that is captured in different states of the optical axis L of the second optical system 22, and composites the registrated plurality of pieces of second captured image data D12 to generate the second generated image data D22.

Accordingly, compositing a plurality of pieces of captured image data after registration thereof can improve the clarity of a desired image component. A crosstalk image component included in the desired image is arranged in different places between captured images by registration of the captured images and thus has relatively low intensity and does not stand out in the generated image data after compositing. This result is more noticeable as the number of pieces of captured image data composited is increased.

Specific examples of registration processing and compositing processing of the image compositing unit 33 will be described later.

Each of the plurality of pieces of first captured image data D11 is preferably related to images having the same subject as an imaging target, and each of the plurality of pieces of second captured image data D12 is preferably related to images having the same subject as an imaging target. Therefore, in the case of temporal change of the subject, it is preferable that influence of a motion of the subject do not appear in the plurality of pieces of first captured image data D11 and in the plurality of pieces of second captured image data D12 by shortening an imaging cycle between images.

The first generated image data D21 and the second generated image data D22 generated in the image generating unit 32 is transferred to, for example, the image processing unit 38, the image storage unit 39, and the display controller 40 disposed in a rear stage or is transferred to the main controller 37 that controls the image generating unit 32.

The image processing unit 38 may perform any type of image processing for the first generated image data D21 and the second generated image data D22 transferred and may transfer the first generated image data D21 and the second generated image data D22 after image processing to the image storage unit 39, the display controller 40, or the main controller 37. The image storage unit 39 stores the first generated image data D21 and the second generated image data D22 transferred. The display controller 40 displays, on the display unit 41, displays the wide-angle image (first generated image) and/or the telescopic image (second generated image) that is reproduced on the basis of the first generated image data D21 and the second generated image data D22 transferred.

The main controller 37 is connected to the imaging optical system 11, the imaging element 24, the image generating unit 32, the image processing unit 38, the image storage unit 39, the display controller 40, the display unit 41, and the user operating unit 42 and to another each unit constituting the imaging device 30 and controls process functions in each unit. The user operating unit 42 is operated by a user to receive input of various instruction commands. The various instruction commands input into the user operating unit 42 are transmitted to the main controller 37, and the main controller 37 can control each unit of the imaging device 30 on the basis of the instruction commands from the user operating unit 42.

Figure 8:
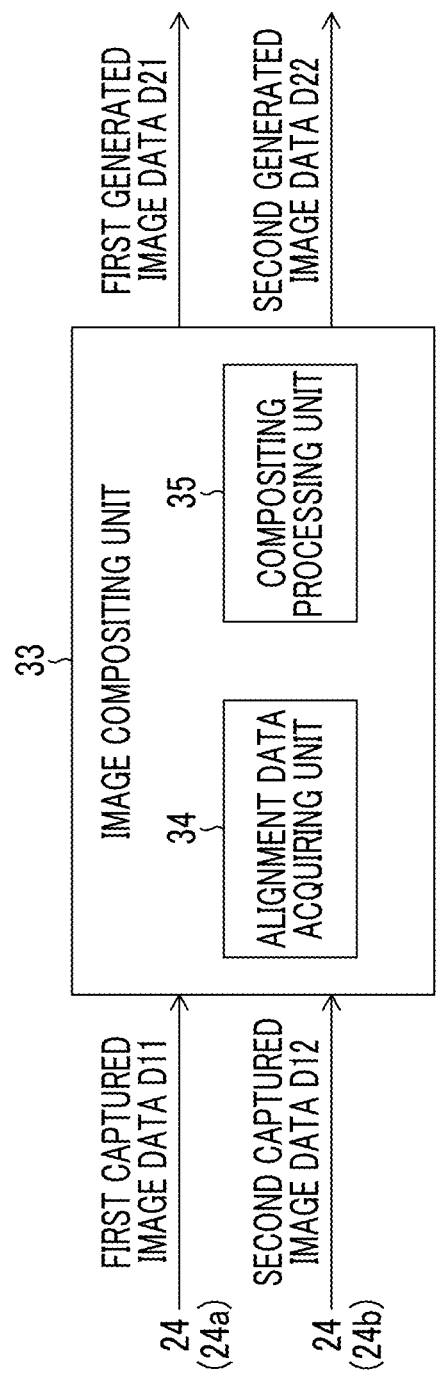
FIG. 8 is a block diagram illustrating a functional configuration example of an image compositing unit.

FIG. 8 is a block diagram illustrating a functional configuration example of the image compositing unit 33.

The image compositing unit 33 of the present example has an alignment data acquiring unit 34 and a compositing processing unit 35, generates the first generated image data D21 from the plurality of pieces of first captured image data D11, and generates the second generated image data D22 from the plurality of pieces of second captured image data D12.

The alignment data acquiring unit 34 acquires the amount of positional shift among the plurality of pieces of first captured image data D11 and the amount of positional shift among the plurality of pieces of second captured image data D12. That is, the plurality of pieces of first captured image data D11 that is captured in different states of the optical axis L of the first optical system 21 is input into the image compositing unit 33, and "the amount of positional shift among the input plurality of pieces of first captured image data D11" required for resolving the shift of the optical axis L of the first optical system 21 is acquired as alignment data from the alignment data acquiring unit 34. Similarly, the plurality of pieces of second captured image data D12 that is captured in different states of the optical axis L of the second optical system 22 is input into the image compositing unit 33, and "the amount of positional shift among the input plurality of pieces of second captured image data D12" required for resolving the shift of the optical axis L of the second optical system 22 is acquired as alignment data from the alignment data acquiring unit 34. The "amount of positional shift" referred hereto can be determined from any viewpoint and, for example, can be represented by the amount of pixel shift required for making the position of the desired image (for example, a main subject) in an image the same for each of "the plurality of pieces of first captured image data D11" and "the plurality of pieces of second captured image data D12".

The compositing processing unit 35 performs registration on a plurality of first captured images (wide-angle images) on the basis of "the amount of positional shift among the plurality of pieces of first captured image data D11" acquired by the alignment data acquiring unit 34 and composites the registrated plurality of first captured images (wide-angle images) to generate the first generated image data D21. Similarly, the compositing processing unit 35 performs registration on a plurality of second captured images (telescopic images) on the basis of "the amount of positional shift among the plurality of pieces of second captured image data D12" acquired by the alignment data acquiring unit 34 and composites the registrated plurality of second captured images (telescopic images) to generate the second generated image data D22. Accordingly, performing image compositing after registration can maintain or improve the image quality of the intended desired image and can significantly reduce influence of the unintended crosstalk image.

Processing methods in the alignment data acquiring unit 34 and in the compositing processing unit 35 are not particularly limited. "Registration and compositing of the plurality of pieces of first captured image data D11" and "registration and compositing of the plurality of pieces of second captured image data D12" can be performed by any method.

Figure 9:
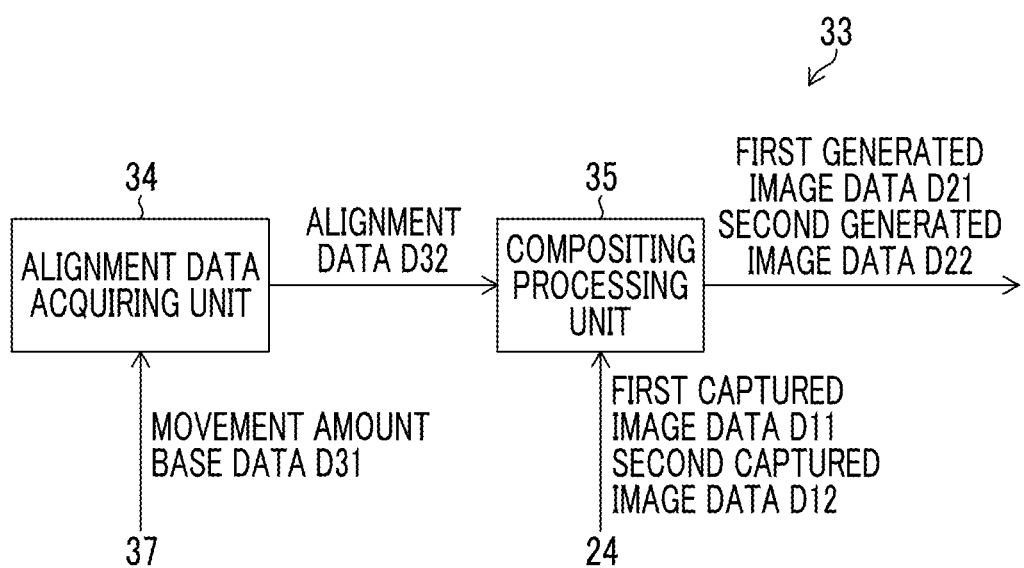
FIG. 9 is a block diagram illustrating one example of processes of an alignment data acquiring unit and a compositing processing unit.

FIG. 9 is a block diagram illustrating one example of processes of the alignment data acquiring unit 34 and the compositing processing unit 35.

The alignment data acquiring unit 34 of the present example acquires alignment data D32 from movement amount base data D31. That is, the alignment data acquiring unit 34, on the basis of calculation formulas for calculating "the amount of positional shift among the plurality of pieces of first captured image data D11" and "the amount of positional shift among the plurality of pieces of second captured image data D12" (refer to, for example, Expression (1) and Expression (2) above), acquires base data required for calculation of the amounts of positional shift (for example, the constant "k", the focal lengths "fw" and "ft" of the first optical system 21 and the second optical system 22, and the angle "θ" of the pan of the imaging device 30 including the imaging optical system 11 above) from the main controller 37 or the like as the movement amount base data D31 and calculates the alignment data D32. The compositing processing unit 35, on the basis of the alignment data D32 transferred from the alignment data acquiring unit 34, performs registration and compositing of the plurality of pieces of first captured image data D11 to generate the first generated image data D21 and performs registration and compositing of the plurality of pieces of second captured image data D12 to generate the second generated image data D22.

Accordingly, the alignment data acquiring unit 34 (image compositing unit 33) of the present example performs registration on the plurality of first captured images on the basis of the state of the optical axis L of the first optical system 21 and the focal length fw of the first optical system 21, and performs registration on the plurality of second captured images on the basis of the state of the optical axis L of the second optical system 22 and the focal length ft of the second optical system 22. Therefore, the present example is suitable in the case of being able to recognize in advance "the amount of difference in the state of the optical axis L of the first optical system 21 at the time of acquiring the plurality of pieces of first captured image data D11" and "the amount of difference in the state of the optical axis L of the second optical system 22 at the time of acquiring the plurality of pieces of second captured image data D12". The present example can be applied to the case of being able to actively control and change the state of the optical axis L of the imaging optical system 11 with, for example, the automatic tracking imaging device 14 (refer to FIG. 2).

Figure 10:
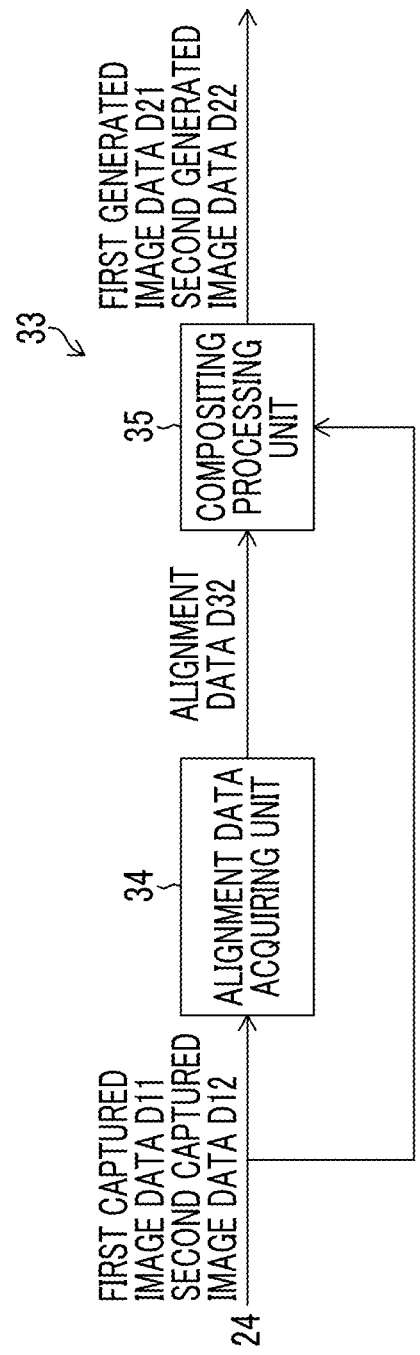
FIG. 10 is a block diagram illustrating another example of the processes of the alignment data acquiring unit and the compositing processing unit.

FIG. 10 is a block diagram illustrating another example of the processes of the alignment data acquiring unit 34 and the compositing processing unit 35.

The alignment data acquiring unit 34 of the present example acquires the alignment data D32 by analyzing the first captured image data D11 and the second captured image data D12. That is, the alignment data acquiring unit 34 acquires "the amount of positional shift among the plurality of pieces of first captured image data D11" by analyzing the plurality of pieces of first captured image data D11, and acquires "the amount of positional shift among the plurality of pieces of second captured image data D12" by analyzing the plurality of pieces of second captured image data D12.

A method for image analysis for acquiring the amount of positional shift is not particularly limited. The alignment data acquiring unit 34 can acquire "the amount of positional shift among the plurality of pieces of first captured image data D11" and "the amount of positional shift among the plurality of pieces of second captured image data D12" by performing any type of image analysis. For example, the positions of "a reference image portion in each of the plurality of first captured images (wide-angle images)" and "a reference image portion in each of the plurality of second captured images (telescopic images)" may be acquired by image analysis, and "the amount of positional shift among the plurality of pieces of first captured image data D11" and "the amount of positional shift among the plurality of pieces of second captured image data D12" may be acquired on the basis of "the positions of the reference image portions" acquired by analysis. The reference image portion referred hereto can be determined from any viewpoint and may be determined on the basis of image feature data related to edges (contours), image feature data related to frequencies, or the like. Therefore, the alignment data acquiring unit 34 may use, as the reference image portion, a main subject image that is detected by using subject recognition processing such as face recognition processing, or may acquire "the amount of positional shift among the plurality of pieces of first captured image data D11" and "the amount of positional shift among the plurality of pieces of second captured image data D12" on the basis of the position of the main subject in the captured image.

The compositing processing unit 35, on the basis of the alignment data D32 transferred from the alignment data acquiring unit 34, performs registration and compositing of the plurality of pieces of first captured image data D11 to generate the first generated image data D21 and performs registration and compositing of the plurality of pieces of second captured image data D12 to generate the second generated image data D22.

Accordingly, the alignment data acquiring unit 34 (image compositing unit 33) of the present example analyzes the plurality of pieces of first captured image data D11 to acquire the position of a first reference image portion in each of the plurality of pieces of first captured image data D11 and performs registration on the plurality of pieces of first captured image data D11 on the basis of the position of the first reference image portion, and analyzes the plurality of pieces of second captured image data D12 to acquire the position of a second reference image portion and performs registration on the plurality of pieces of second captured image data D12 on the basis of the position of the second reference image portion. Therefore, the present example can be applied to not only the case of being able to recognize in advance "the amount of difference in the state of the optical axis L of the first optical system 21 at the time of acquiring the plurality of pieces of first captured image data D11" and "the amount of difference in the state of the optical axis L of the second optical system 22 at the time of acquiring the plurality of pieces of second captured image data D12" but also the case of not being able to recognize the amounts of difference in advance. Thus, the present example may be applied to the case of actively controlling and changing the state of the optical axis L of the imaging optical system 11 with, for example, the automatic tracking imaging device 14 (refer to FIG. 2) or may be applied to the case of randomly changing the state of the optical axis L of the imaging optical system 11 with a camera shake or the like of the digital camera 10 (refer to FIG. 1).

Figure 11:
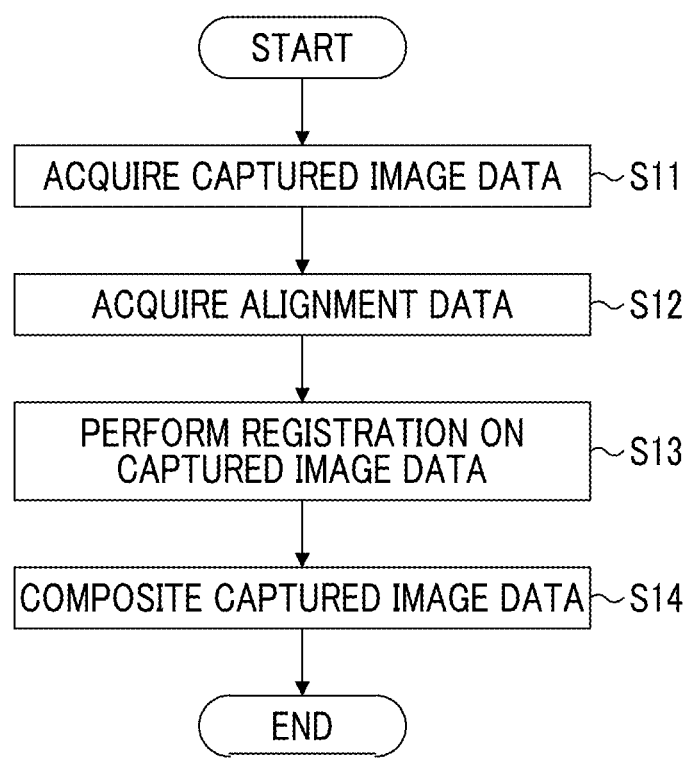
FIG. 11 is a flowchart illustrating a generation flow of generated image data (first generated image data and second generated image data) in an image generating unit according to the first embodiment.

FIG. 11 is a flowchart illustrating a generation flow of the generated image data (the first generated image data D21 and the second generated image data D22) in the image generating unit 32 according to the first embodiment.

First, captured image data (the first captured image data D11 and the second captured image data D12) is acquired by the image generating unit 32 (Step S11 in FIG. 11). The captured image data output from the imaging element 24 (the first sensor group 24a and the second sensor group 24b) may be directly input into the image generating unit 32 or may be indirectly input into the image generating unit 32. The captured image data may be input from the imaging element 24 into another processing unit and may be input from the other processing unit into the image generating unit 32.

In the image compositing unit 33 (alignment data acquiring unit 34) of the image generating unit 32, the alignment data that indicates "the amount of positional shift among the input plurality of pieces of first captured image data D11" required for resolving the shift of the optical axis L of the first optical system 21 and "the amount of positional shift among the input plurality of pieces of second captured image data D12" required for resolving the shift of the optical axis L of the second optical system 22 is acquired (S12).

In the image compositing unit 33 (compositing processing unit 35) of the image generating unit 32, the plurality of first captured images (first captured image data D11) captured in different states of the optical axis L of the first optical system 21 is registrated (S13), and the registrated plurality of first captured images (first captured image data D11) is composited to generate the first generated image (wide-angle image;

first generated image data D21) (S14). Similarly, in the image compositing unit 33 (compositing processing unit 35) of the image generating unit 32, the plurality of second captured images (second captured image data D12) captured in different states of the optical axis L of the second optical system 22 is registered (S13), and the registered plurality of second captured images (second captured image data D12) is composited to generate the second generated image (telescopic image: second generated image data D22) (S14).

An application target of the above series of processes illustrated in FIG. 11 is not particularly limited. The above series of processes may be applied to, for example, captured image data (the first captured image data D11 and the second captured image data D12) that is acquired by imaging by the user holding the digital camera 10 illustrated in FIG. 1 with a hand. In addition, the above series of processes may be applied to captured image data (the first captured image data D11 and the second captured image data D12) that is acquired by imaging by the automatic tracking imaging device 14 illustrated in FIG. 2. Particularly, in the case of being able to actively and correctly change the state of the optical axis L of the imaging optical system 11 (the first optical system 21 and the second optical system 22) as in the automatic tracking imaging device 14 in FIG. 2, the image quality of a generated image (the first generated image data D21 and the second generated image data D22) can be effectively improved as described below.

Figure 12:
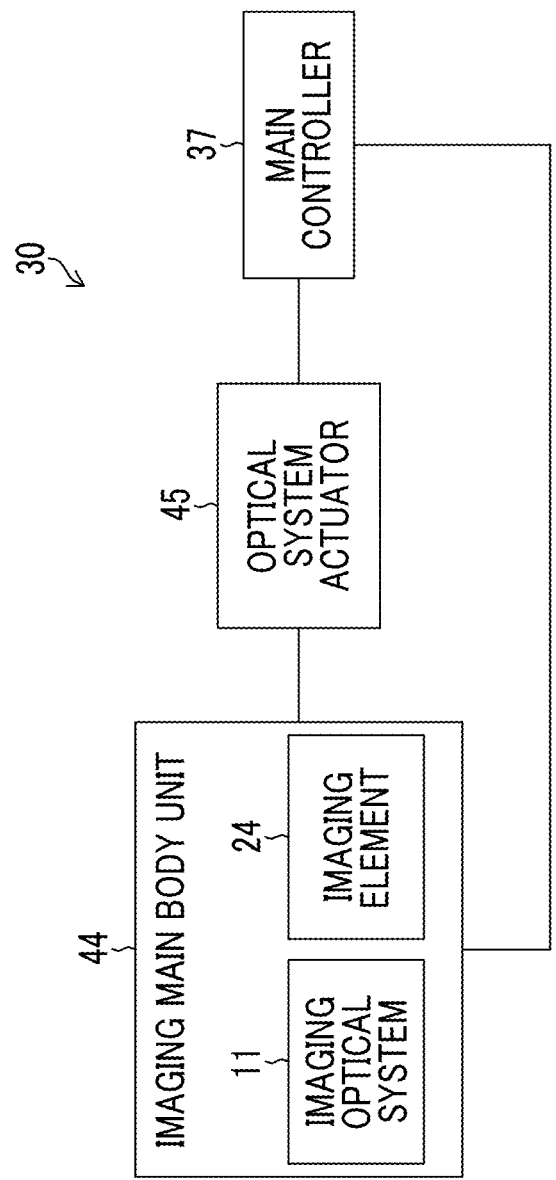
FIG. 12 is a block diagram illustrating one example of the case of an imaging main body unit being movable by an optical system actuator.

FIG. 12 is a block diagram illustrating one example of the case of the imaging main body unit 44 being movable by an optical system actuator 45. While FIG. 12 illustrates only the imaging main body unit 44 (the imaging optical system 11 and the imaging element 24), the optical system actuator 45, and the main controller 37, the imaging device 30 illustrated in FIG. 12 includes each unit illustrated in FIG. 7 to FIG. 10 (for example, the image generating unit 32).

The optical system actuator 45 of the present example, under control of the main controller 37, controls the imaging main body unit 44 including the imaging optical system 11 and the imaging element 24 to move the imaging optical system 11 and change the state of the optical axis L of the first optical system 21 and the second optical system 22.

A specific form of the optical system actuator 45 is not particularly limited and may be, for example, a pan and tilt device that pans and tilts the imaging optical system 11 illustrated in FIG. 2. That is, including a pan driving unit and a tilt driving unit in the optical system actuator 45 and performing a pan operation and a tilt operation for the imaging main body unit 44 (the imaging optical system 11 and the imaging element 24) with the optical system actuator 45 can make the states of the optical axis L of the first optical system 21 and the optical axis L of the second optical system 22 two-dimensionally different. In this case, the optical system actuator 45 preferably performs pan and tilt operations for the imaging main body unit 44 (the imaging optical system 11 and the imaging element 24) in accordance with positional information (movement amount information) that is set in advance by the main controller 37. The amount of movement of the subject image that occurs in each image of the first captured image (wide-angle image) and the second captured image (telescopic image) on the basis of the amount of pan and tilt set in advance can be calculated in advance from designed values of the imaging device 30 or can be measured in advance by performing calibration imaging in a real machine of the imaging device 30. Accordingly, on the basis of "the amount of movement of the subject image in each image of the first captured image (wide-angle image) and the second captured image (telescopic image)", correction (registration processing) is performed for an captured image group to remove the change in the position of the desired image due to the change of the state of the optical axis L of the imaging optical system 11.

As described above, the plurality of first captured images (first captured image data D11) is preferably captured in two-dimensionally different states of the optical axis L of the first optical system 21 and output from the first sensor group 24a. The plurality of first captured images, for example, may be captured in one-dimensionally different states of the optical axis L of the first optical system 21 and output from the first sensor group 24a. Similarly, while the plurality of second captured images (second captured image data D12) is preferably captured in two-dimensionally different states of the optical axis L of the second optical system 22 and output from the second sensor group 24b, the plurality of second captured images, for example, may be captured in one-dimensionally different states of the optical axis L of the second optical system 22 and output from the second sensor group 24b.

A tripod head with which the main controller 37 can control pan and tilt operations can be used as the optical system actuator 45. In this case, the imaging device 30 may be configured by, for example, fixedly installing the digital camera 10 illustrated in FIG. 1 on the tripod head (optical system actuator 45).

The embodiment of "changing the state of the optical axis L of the first optical system 21 and the second optical system 22" with the optical system actuator 45 is not particularly limited. The optical system actuator 45, for example, may change the "direction" of the optical axis L of the first optical system 21 and the second optical system 22 or may change the "relative position" of the optical axis L of the first optical system 21 and the second optical system 22 with respect to the subject. That is, the plurality of pieces of first captured image data D11 that is input into the image generating unit 32 (image compositing unit 33) may be captured in different states of the direction of the optical axis L of the first optical system 21 and output from the first sensor group 24a or may be captured in different states of the relative position of the optical axis L of the first optical system 21 with respect to the subject and output from the first sensor group 24a. The plurality of pieces of second captured image data D12 that is input into the image generating unit 32 (image compositing unit 33) may be captured in different states of the direction of the optical axis L of the second optical system 22 and output from the second sensor group 24b or may be captured in different states of the relative position of the optical axis L of the second optical system 22 with respect to the subject and output from the second sensor group 24b.

A method for changing the "direction" or the "relative position" of the optical system L of the first optical system 21 and the second optical system 22 is not particularly limited. For example, "the direction of the optical axis L" can be changed by performing pan and tilt operations for the first optical system 21 and the second optical system 22 with the pan and tilt device illustrated in FIG. 2 to change the orientation (angle) of the optical axis L. In addition, "the relative position of the optical axis L" can be changed by relatively sliding the first optical system 21 and the second optical system 22 with respect to the subject to move the optical axis L in the horizontal direction and/or the vertical direction (refer to FIG. 39 described later).

Accordingly, active control of the state of the optical axis L of the imaging optical system 11 (the first optical system 21 and the second optical system 22) by the optical system actuator 45 under control of the main controller 37 can acquire the plurality of pieces of first captured image data D11 and the plurality of pieces of second captured image data D12, which are the bases of the first generated image data D21 and the second generated image data D22, in a desired optical axis state that is determined in advance. Accordingly, the image generating unit 32 (image compositing unit 33) can generate the first generated image data D21 and the second generated image data D22 of high quality from the plurality of pieces of first captured image data D11 and the plurality of pieces of second captured image data D12.

The image compositing unit 33, for example, can acquire the generated image data with a compositing method that uses the arithmetic mean of the captured image data. That is, the image compositing unit 33 can composite the plurality of first captured images to generate the first generated image data D21 by adding the registrated plurality of pieces of first captured image data D11 and calculating the average of the data after addition. In addition, the image compositing unit 33 can composite the plurality of second captured images to generate the second generated image data D22 by adding the registrated plurality of pieces of second captured image data D12 and calculating the average of the data after addition.

Figure 13:
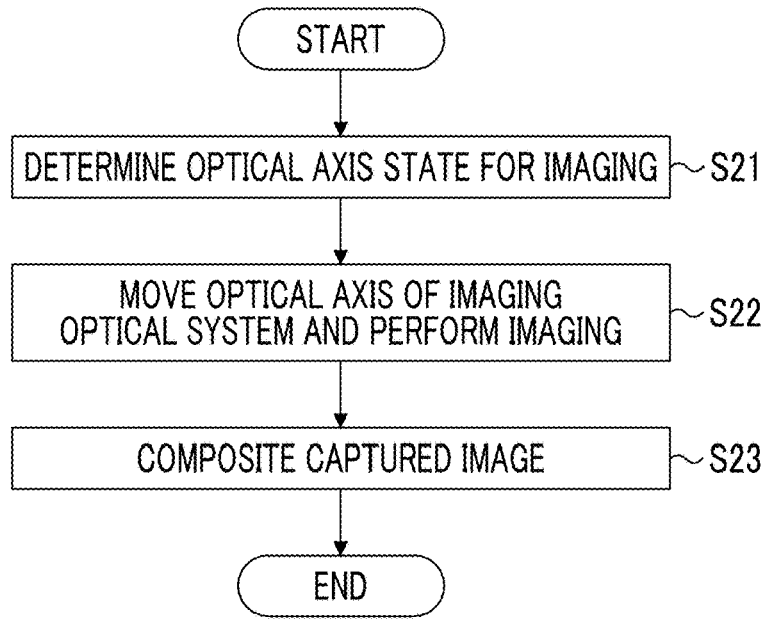
FIG. 13 is a flowchart illustrating one example of the case of acquiring the generated image data with a compositing method that uses the arithmetic mean of captured image data.

FIG. 13 is a flowchart illustrating one example of the case of acquiring the generated image data with the compositing method that uses the arithmetic mean of the captured image data. First, the state of the optical axis L for imaging is determined by the main controller 37 (S21 in FIG. 13). The optical system actuator 45 controls the imaging main body unit 44 in accordance with the determination to move the optical axis L of the imaging optical system 11 (the first optical system 21 and the second optical system 22), and the imaging main body unit 44 (the imaging optical system 11 and the imaging element 24) images the plurality of pieces of first captured image data D11 and the plurality of pieces of second captured image data D12 (S22). Accordingly, the plurality of pieces of first captured image data D11 and the plurality of pieces of second captured image data D12 that are captured in accordance with the state of the optical axis L for imaging determined in advance by the main controller 37 are registrated and composited in the image generating unit 32 (image compositing unit 33) (S23), and the first generated image data D21 and the second generated image data D22 are generated.

The image compositing unit 33 can acquire the generated image data with a compositing method that uses the weighted mean of the captured image data. That is, the image compositing unit 33 can composite the plurality of first captured images to generate the first generated image data D21 by calculating the weighted mean of the plurality of pieces of first captured image data D11 on the basis of a weight that is determined in accordance with the state of the optical axis L of the first optical system 21 at the time of imaging. In addition, the image compositing unit 33 can composite the plurality of second captured images to generate the second generated image data D22 by calculating the weighted mean of the plurality of pieces of second captured image data D12 on the basis of a weight that is determined in accordance with the state of the optical axis L of the second optical system 22 at the time of imaging.

Figure 14:
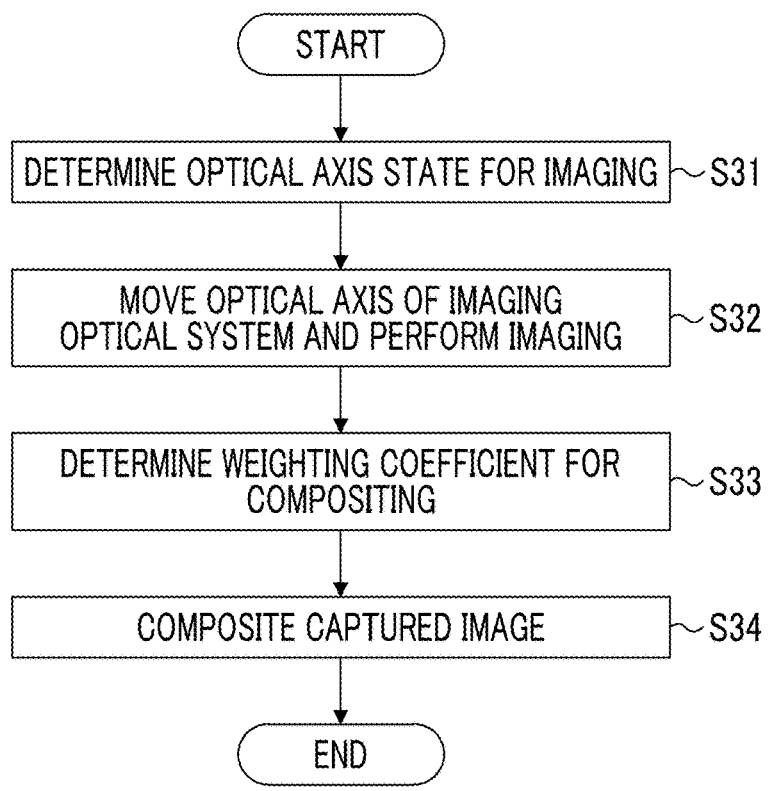
FIG. 14 is a flowchart illustrating one example of the case of acquiring the generated image data with a compositing method that uses the weighted mean of the captured image data.

FIG. 14 is a flowchart illustrating one example of the case of acquiring the generated image data with the compositing method that uses the weighted mean of the captured image data. In the same manner as the example illustrated in FIG. 13 even in the present example, the state of the optical axis L for imaging is determined by the main controller 37 (S31 in FIG. 14), the optical system actuator 45 moves the optical axis L of the imaging optical system 11 (the first optical system 21 and the second optical system 22) in accordance with the determination, and the imaging main body unit 44 (the imaging optical system 11 and the imaging element 24) images the plurality of pieces of first captured image data D11 and the plurality of pieces of second captured image data D12 (S32). However, in the present example, weighting coefficients for compositing are determined by the main controller 37 for each of "the plurality of pieces of first captured image data D11" and "the plurality of pieces of second captured image data D12" (S33). The image generating unit 32 (image compositing unit 33) performs registration on the plurality of pieces of first captured image data D11, performs registration on the plurality of pieces of second captured image data D12, and composites captured images by calculating the weighted mean with use of the weighting coefficients for compositing (S34) to generate the first generated image data D21 and the second generated image data D22.

As described above, in the case of being able to actively adjust the optical axis L of the imaging optical system 11 (the first optical system 21 and the second optical system 22) with the optical system actuator 45 to a desired state, studying the pattern of states of the optical axis L at the time of imaging the plurality of pieces of first captured image data D11 and the plurality of pieces of second captured image data D12 can more effectively reduce a crosstalk component.

For example, a state distribution of the optical axis L at the time of imaging the plurality of pieces of first captured image data D11 and the plurality of pieces of second captured image data D12 may be set in accordance with a one-dimensional or two-dimensional Gaussian distribution. In this case, a crosstalk image component that remains in each of the first generated image data D21 and the second generated image data D22 after image compositing is based on convolution of the Gaussian distribution and the crosstalk image component included in the first captured image data D11 and in the second captured image data D12 and thus is very smoothly blurred image. Thus, each of the images (the wide-angle image and the telescopic image) that are based on the first generated image data D21 and the second generated image data D22 does not have a crosstalk component that stands out at the time of observation, and has preferable image quality.

Compositing a plurality of images related to the same subject by overlaying with the positions thereof two-dimensionally slightly shifted can be mathematically represented by calculation of convolution of "a distribution g of shift compositing" to "a signal f having a two-dimensional spatial distribution" (convolution: f*g).

Figure 15A:
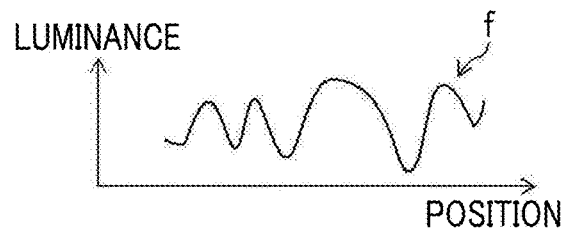
FIGS. 15A to 15C are conceptual diagrams for describing calculation of convolution of "a distribution of shift compositing" to "a signal having a two-dimensional spatial distribution".
Figure 15B:
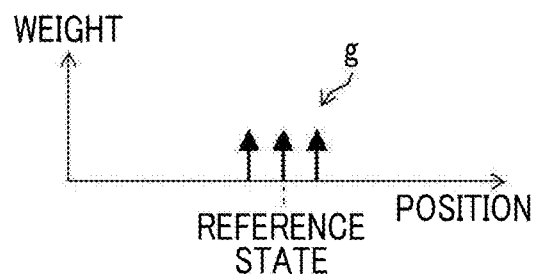
Figure 15C:
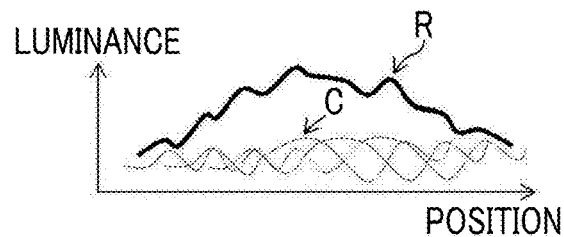

FIGS. 15A to 15C are conceptual diagrams for describing calculation of convolution of "the distribution g of shift compositing" to "the signal f having a two-dimensional spatial distribution". FIG. 15A illustrates the "signal f (image data)" that has a luminance distribution according to positions. FIG. 15B illustrates the "distribution g of shift compositing (convolution kernel)" that defines weights according to positions. FIG. 15C illustrates the result of calculation of convolution of the distribution g of shift compositing illustrated in FIG. 15B to the signal f illustrated in FIG. 15A. In FIG. 15A and FIG. 15C, the vertical axis denotes the magnitude of luminance, and the horizontal axis denotes a one-dimensional position. In FIG. 15B, the vertical axis denotes the magnitude of the weight of the distribution g of shift compositing, and the horizontal axis denotes a one-dimensional position.

As is apparent from FIG. 15C, compositing a plurality of images related to the same subject by overlaying with the positions thereof two-dimensionally slightly shifted strongly reduces a high-frequency spatial frequency component included in an image signal illustrated in FIG. 15A compared with a low-frequency spatial frequency component. Consequently, a composited image is a so-called image with blurred details. While FIG. 15A to FIG. 15C illustrate an example of relationship with a one-dimensional position as a reference for convenience of description, the same example of relationship is established in the case of using a two-dimensional position as a reference.

Assuming that the plurality of images that is the base of compositing is limited in number, the amount of shift of the position is discrete. Thus, the "distribution g of shift compositing" that is the kernel of the convolution calculation is a transfer function based on the sum of a plurality of delta functions, and a function that is acquired by Fourier transform of the transfer function represents a frequency transfer property.

In the case of intending to "neatly blur" the crosstalk image component, it is known that a preferable result is acquired if a low-pass filter that reduces a high-frequency component is used as the transfer function. In order for the above "kernel of convolution calculation (distribution g of shift compositing)" configured of the sum of a plurality of delta functions to have the effect of the low-pass filter, for example, Method 1 and/or Method 2 below can be used.

(Method 1) Set the strength distribution of a plurality of delta functions in the shape of the Gaussian distribution.

(Method 2) Set the density distribution of a plurality of delta functions in the shape of the Gaussian distribution.

Figure 16:
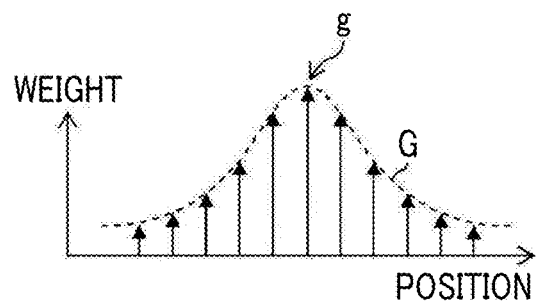
FIG. 16 is a diagram illustrating one example of a strength distribution of a plurality of delta functions constituting the distribution of shift compositing and particularly is a diagram for describing an example of setting a strength distribution (weight) of a plurality of delta functions in accordance with a Gaussian distribution.

FIG. 16 is a diagram illustrating one example of the strength distribution of the plurality of delta functions constituting the distribution g of shift compositing and particularly is a diagram for describing an example of setting the strength distribution (weight) of the plurality of delta functions in accordance with a Gaussian distribution G. In FIG. 16, the vertical axis denotes the magnitude of the strength (weight), and the horizontal axis denotes a position. As in the present example, determining the strengths (weights) of each delta function constituting the distribution g of shift compositing in accordance with the Gaussian distribution G can make the "kernel of convolution calculation (distribution of shift compositing)" have the effect of the low-pass filter.

Applying the "distribution g of shift compositing" illustrated in FIG. 16 to a crosstalk image corresponds to, for example, compositing processing that calculates the weighted mean of the captured image data by making a delta function have a greater weight as being closer to the central position (that is, the position in a reference state) with respect to the intensity (for example, luminance) of an image acquired by imaging in evenly shifted positions.

Therefore, in the case of the image compositing unit 33 acquiring the generated image data with the compositing method that uses the weighted mean as described above, the crosstalk image can be neatly blurred by, for example, determining, from a Gaussian distribution based on the state of the optical axis L of the first optical system 21, a weight that is determined in accordance with the state of the optical axis L of the first optical system 21 or by determining, from a Gaussian distribution based on the state of the optical axis L of the second optical system 22, a weight that is determined in accordance with the state of the optical axis L of the second optical system 22.

Figure 17A:
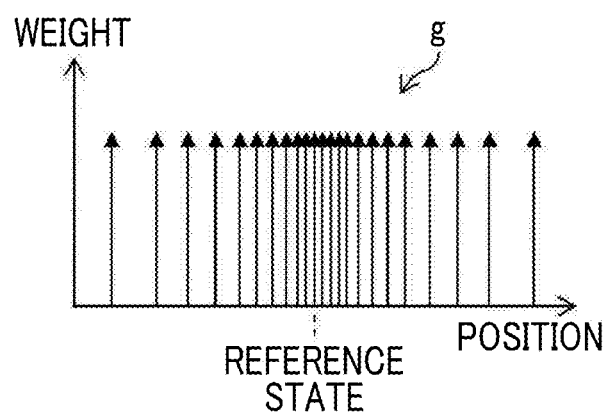
FIGS. 17A and 17B are diagrams illustrating another example of the strength distribution of the plurality of delta functions constituting the distribution of shift compositing.
Figure 17B:
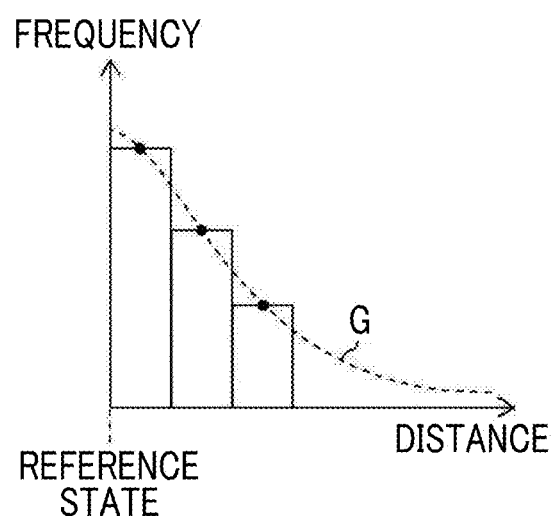

FIGS. 17A and 17B are diagrams illustrating another example of the strength distribution of the plurality of delta functions constituting the distribution g of shift compositing.

FIG. 17A is a diagram for describing an example of disposing a difference in density in the strength distribution based on positions. FIG. 17B is a diagram for describing an example of setting the difference in density in accordance with the Gaussian distribution G. In FIG. 17A, the vertical axis denotes the magnitude of the strength (weight), and the horizontal axis denotes a position. In FIG. 17B, the vertical axis denotes the frequency of (the number of existing) delta functions, and the horizontal axis denotes a distance from the position indicating the reference state.

As in the example illustrated in FIG. 17A, even if the strengths (weights) of the plurality of delta functions constituting the distribution g of shift compositing are the same, "the kernel of convolution calculation (distribution of shift compositing)" can have the effect of the low-pass filter by disposing a difference in density in the strength distribution of the delta functions in accordance with positions and determining the distribution g of shift compositing in such a manner that delta functions densely exist in positions closer to the reference state of the optical axis L and that delta functions sparsely exist in positions more away from the reference state of the optical axis L.

Applying the "distribution g of shift compositing" illustrated in FIG. 17A to the crosstalk image corresponds to, for example, compositing processing that makes the arrangement distribution of the optical axis L uneven in the case of performing imaging by shifting the position of the optical axis L, acquires multiple captured images by performing imaging with higher density in positions closer to the central position (that is, the position of the reference state), and calculates the arithmetic mean of the captured image data acquired by imaging.

Therefore, in the case of the image compositing unit 33 acquiring the generated image data with the compositing method that uses the arithmetic mean as described above, the plurality of first captured images is more densely imaged as the optical axis L of the first optical system 21 is closer to the reference state thereof, the plurality of first captured images is more sparsely imaged as the optical axis L of the first optical system 21 is more away from the reference state thereof, and the first captured image data D11 is output from the first sensor group 24*a*. The plurality of second captured images is more densely imaged as the optical axis L of the second optical system 22 is closer to the reference state thereof, the plurality of second captured images is more sparsely imaged as the optical axis L of the second optical system 22 is more away from the reference state thereof, and the second captured image data D12 is output from the second sensor group 24*b*. Thus, the crosstalk image can be neatly blurred.

Especially, as illustrated in FIG. 17B determining the frequency of (number of existing) delta functions constituting the distribution g of shift compositing in accordance with the Gaussian distribution G with respect to the distance from the reference state can more effectively realize the low-pass filter effect for the crosstalk image. The frequency of (number of existing) delta functions illustrated in FIG. 17B is determined on the basis of the number of delta functions that exist in a predetermined range of distance from the reference state. Accordingly, the crosstalk image can be more neatly blurred by determining the distribution density of the state of the optical axis L of the first optical system 21 at the time of capturing the plurality of first captured images on the basis of the Gaussian distribution or by determining the distribution density of the state of the optical axis L of the second optical system 22 at the time of capturing the plurality of second captured images on the basis of the Gaussian distribution.

While FIG. 16 and FIGS. 17A and 17B illustrate examples of relationship with a one-dimensional position as a reference, the same example of relationship is established in the case of using a two-dimensional position as a reference.

The example illustrated in FIG. 16 may be combined with the example illustrated in FIGS. 17A and 17B. That is, in the case of the image compositing unit 33 acquiring the generated image data with the compositing method that uses the weighted mean, it is preferable that a plurality of first captured images be more densely imaged as the optical axis L is closer to the reference state thereof, that the plurality of first captured images be more sparsely imaged as the optical axis L is more away from the reference state thereof, and that the weight that is determined in accordance with the state of the optical axis L of the imaging optical system 11 (the first optical system 21 and the second optical system 22) be determined from the Gaussian distribution based on the state of the optical axis L. Even in this case, as illustrated in FIG. 17B, the distribution density of the state of the optical axis L of the imaging optical system 11 (the first optical system 21 and the second optical system 22) at the time of capturing the captured image is preferably determined on the basis of the Gaussian distribution.

The strengths (weights) of each delta function constituting the distribution g of shift compositing may be determined in accordance with a distribution other than the Gaussian distribution G (refer to FIG. 16). The difference in density in the strength distribution of the plurality of delta functions constituting the distribution g of shift compositing may be determined in accordance with a distribution other than the Gaussian distribution (refer to FIG. 17B).

While the above example illustrated in FIG. 12 to FIG. 17B describes the case of actively controlling the state of the optical axis L of the imaging optical system 11 with the optical system actuator 45, "the image generation method of performing registration on and compositing the plurality of captured images" above can also be applied to the case of not actively controlling the state of the optical axis L of the imaging optical system 11. That is, even in the case of imaging an image with the user holding the digital camera 10 illustrated in FIG. 1 in a hand, the desired image in which influence of the crosstalk image is reduced can be acquired in the same manner as in "the case of actively controlling the state of the optical axis L of the imaging optical system 11" above.

For example, generally used is a shake correction technology that analyzes a captured image to detect a shake component of the image and reduces influence of a shake on the basis of the shake component. Therefore, even in the case of capturing the wide-angle image and the telescopic image above with the digital camera 10, the desired image in each of the wide-angle image and the telescopic image has a stronger signal strength than the crosstalk image, and an imaging shake (camera shake) of the desired image (main subject or the like) can be detected by using a shake component detecting method that is generally used. If the imaging shake occurs at the time of imaging a plurality of images, the images are consequently captured in different states of the optical axis L of the imaging optical system 11 (the first optical system 21 and the second optical system 22). Therefore, performing compositing processing, in the same manner as in "the case of actively controlling the state of the optical axis L of the imaging optical system 11" above, by performing registration on the desired image for the plurality of captured images (the first captured image data D11 and the second captured image data D12) acquired along with the imaging shake (camera shake) can not only reduce influence of the shake in the desired image but also can reduce influence of the crosstalk image in the generated image (the first generated image data D21 and the second generated image data D22). In addition, the optical system actuator 45 such as the pan and tilt device is not required to be disposed for the imaging device 30 in the present example that is held by the user in imaging like the digital camera 10 or the like. Thus, the device configuration can be simplified and realized at low cost and can be easily made to have a small size.

Next, a specific example of the present embodiment will be described.

FIG. 18 is a diagram for describing the amount of shift of the telescopic image by a pan operation. (c) of FIG. 18 illustrates the second captured image (telescopic image) that is captured in a first pan position. (b) of FIG. 18 illustrates the second captured image (telescopic image) that is captured in a second pan position. FIG. 19 is a diagram for describing the amount of shift of the wide-angle image by a pan operation. (c) of FIG. 19 illustrates the first captured image (wide-angle image) that is captured in the first pan position. (b) of FIG. 19 illustrates the first captured image (wide-angle image) that is captured in the second pan position. (c) of FIG. 18 and (c) of FIG. 19 are images that are captured by using the first optical system 21 and the second optical system 22 having the same optical axis L. Similarly, (b) of FIG. 18 and (b) of FIG. 19 are images that are captured by using the first optical system 21 and the second optical system 22 having the same optical axis L. "Sw" that is represented in (c) of FIG. 18 and (b) of FIG. 18 denotes a difference in the position of the same image location in the telescopic image (amount of positional shift) between the first pan position and the second pan position and is represented by Expression (1) above. Similarly, "St" that is represented in (c) of FIG. 19 and (b) of FIG. 19 denotes a difference in the position of the same image location in the wide-angle image (amount of positional shift) between the first pan position and the second pan position and is represented by Expression (2) above. The amounts of positional shift represented by "Sw" and "St" represent the amount of positional shift of the same location in FIGS. 18 and 19.

As is apparent from FIGS. 18 and 19, the amount of positional shift of the telescopic image and the amount of positional shift of the wide-angle image are different even with the same amount of pan movement. Generally, the amount of positional shift of the telescopic image is greater than the amount of positional shift of the wide-angle image (Sw>St).

FIG. 20 is a diagram for describing the amount of shift of the telescopic image (desired image) that includes the crosstalk image (wide-angle image). (c) of FIG. 20 illustrates the second captured image (telescopic image) that is captured in the first pan position. (b) of FIG. 20 illustrates the second captured image (telescopic image) that is captured in the second pan position. FIG. 21 is a diagram for describing the amount of shift of the wide-angle image (desired image) that includes the crosstalk image (telescopic image). (c) of FIG. 21 illustrates the first captured image (wide-angle image) that is captured in the first pan position. (b) of FIG. 21 illustrates the first captured image (wide-angle image) that is captured in the second pan position.

The above principle related to positional shift that is described with reference to FIGS. 18 and 19 is applied in the same manner to the case of the captured image including the crosstalk image in addition to the original desired image. That is, even if the captured image is intended to be any image of the telescopic image (refer to FIG. 20) and the wide-angle image (refer to FIG. 21), the amount of positional shift based on the difference in the state of the optical axis L of the imaging optical system 11 (the first optical system 21 and the second optical system 22) is greater in the telescopic image than in the wide-angle image (Sw>St).

Figure 22:
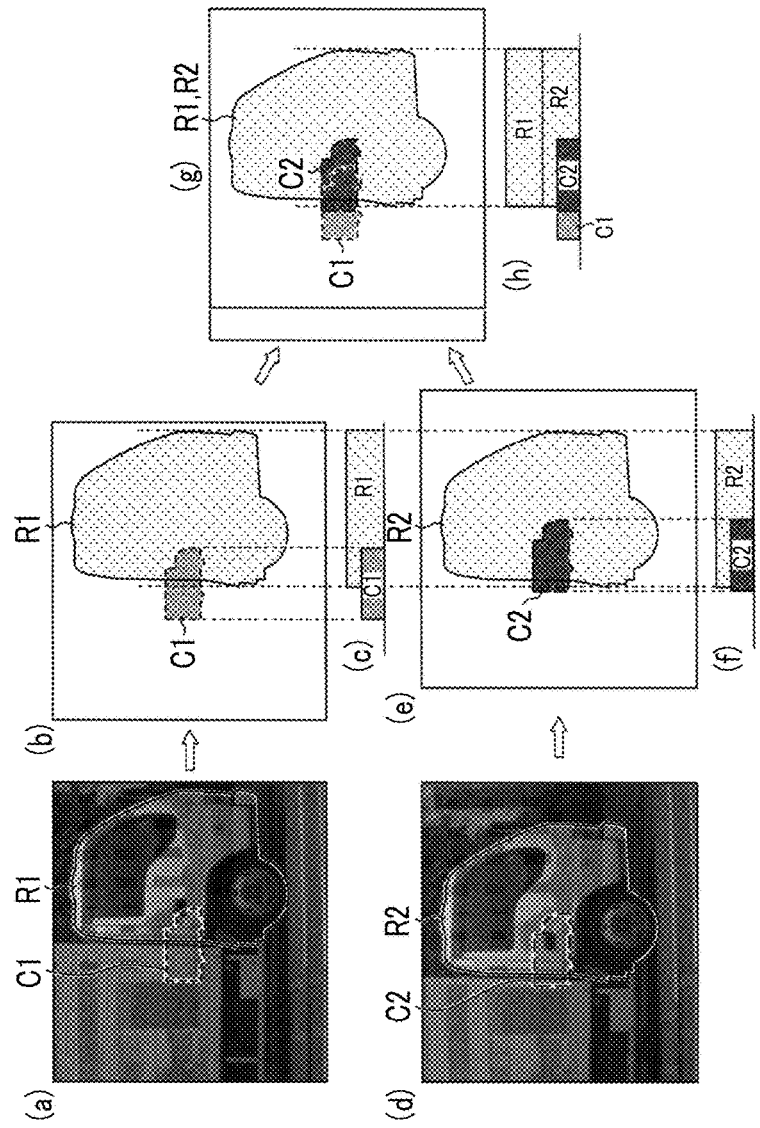
FIG. 22 is a diagram for describing a compositing mechanism of captured images in the first embodiment. (c) of FIG. 22 illustrates "the telescopic image (desired image) that includes a crosstalk image (wide-angle image)" acquired in the first pan position. (b) of FIG. 22 schematically illustrates a positional relationship between a part of the telescopic image (desired image) and the crosstalk image (wide-angle image) illustrated in (c) of FIG. 22. (c) of FIG. 22 schematically illustrates the positional relationship illustrated in (b) of FIG. 22. (d) of FIG. 22 illustrates "the telescopic image (desired image) that includes a crosstalk image (wide-angle image)" acquired in the second pan position. (e) of FIG. 22 schematically illustrates a positional relationship between a part of the telescopic image (desired image) and the crosstalk image (wide-angle image) illustrated in (d) of FIG. 22. (f) of FIG. 22 schematically illustrates the positional relationship illustrated in (e) of FIG. 22. (g) of FIG. 22 illustrates a composited display example that is based on the schematic diagram illustrated in (b) of FIG. 22 and the schematic diagram illustrated in (e) of FIG. 22. (h) of FIG. 22 illustrates a conceptual diagram related to compositing that is based on the schematic diagram illustrated in (c) of FIG. 22 and the schematic diagram illustrated in (f) of FIG. 22.

FIG. 22 is a diagram for describing a compositing mechanism of captured images in the first embodiment. (c) of FIG. 22 illustrates "the telescopic image (desired image) that includes the crosstalk image (wide-angle image)" acquired in the first pan position. (b) of FIG. 22 schematically illustrates a positional relationship between a part of the telescopic image (desired image) and the crosstalk image (wide-angle image) illustrated in (c) of FIG. 22. (c) of FIG. 22 schematically illustrates the positional relationship illustrated in (b) of FIG. 22. (d) of FIG. 22 illustrates "the telescopic image (desired image) that includes the crosstalk image (wide-angle image)" acquired in the second pan position. (e) of FIG. 22 schematically illustrates a positional relationship between a part of the telescopic image (desired image) and the crosstalk image (wide-angle image) illustrated in (d) of FIG. 22. (f) of FIG. 22 schematically illustrates the positional relationship illustrated in (e) of FIG. 22. (g) of FIG. 22 illustrates a composited display example that is based on the schematic diagram illustrated in (b) of FIG. 22 and the schematic diagram illustrated in (e) of FIG. 22. (h) of FIG. 22 illustrates a conceptual diagram related to compositing that is based on the schematic diagram illustrated in (c) of FIG. 22 and the schematic diagram illustrated in (f) of FIG. 22.

As described above, the relative positions of the crosstalk image (wide-angle image) and the desired image (telescopic image) are changed in accordance with the state of the optical axis L. Therefore, for example, "the relative distance between the crosstalk image (wide-angle image; refer to a first crosstalk component C1) and the desired image (telescopic image; refer to a first desired image component R1)" in the first pan position illustrated in (c) of FIG. 22 to (c) of FIG. 22 is greater than "the relative distance between the crosstalk image (wide-angle image; refer to a second crosstalk component C2) and the desired image (telescopic image; refer to a second desired image component R2)" in the second pan position illustrated in (d) of FIG. 22 to (f) of FIG. 22. As illustrated in (g) of FIG. 22 and FIG. 22(h), if the captured image captured in the first pan position and the captured image captured in the second pan position are registered on the basis of the position of the desired image (refer to the first desired image component R1 and the second desired image component R2), the positions of "the crosstalk image (refer to the first crosstalk component C1) included in the captured image captured in the first pan position" and "the crosstalk image (refer to the second crosstalk component C2) included in the captured image captured in the second pan position" are shifted. Thus, if "the telescopic image captured in the first pan position and the telescopic image captured in the second pan position" that are registered on the basis of the position of the desired image are composited, the desired image (telescopic image; refer to the first desired image component R1 and the second desired image component R2) is composited in a state of matching positions and thus is very clear image. However, the crosstalk image (wide-angle image; refer to the first crosstalk component C1 and the second crosstalk component C2) is composited in a state of non-matching positions and thus has relatively low image intensity and does not stand out.

Figure 23B:
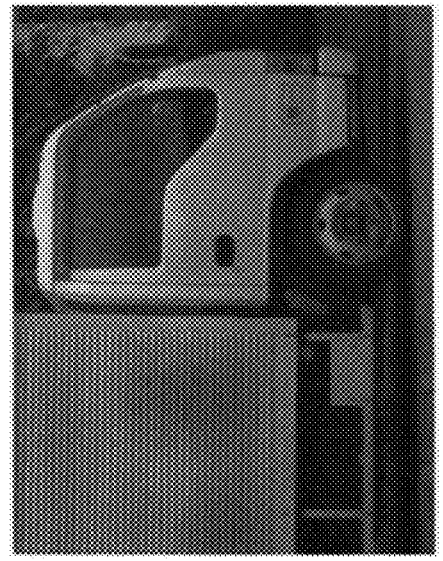
FIGS. 23A and 23B are diagrams illustrating a generation example of the telescopic image acquired by the imaging device according to the first embodiment.
Figure 23A:
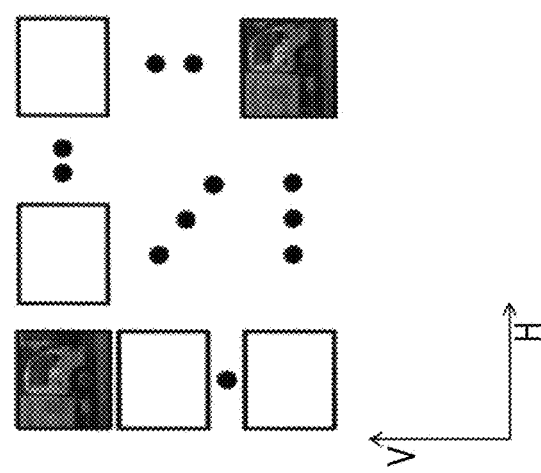
Figure 24B:
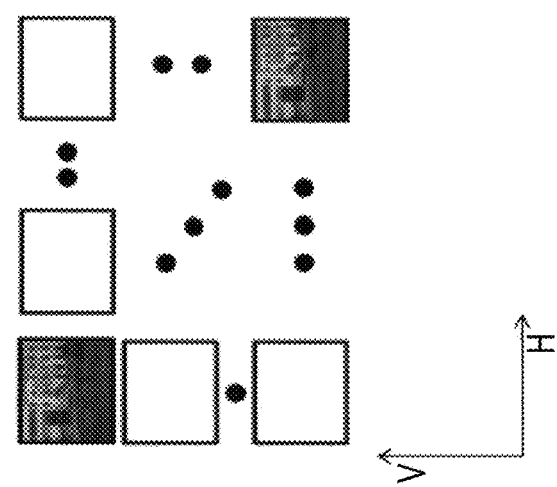
FIGS. 24A and 24B are diagrams illustrating a generation example of the wide-angle image acquired by the imaging device according to the first embodiment.
Figure 24A:
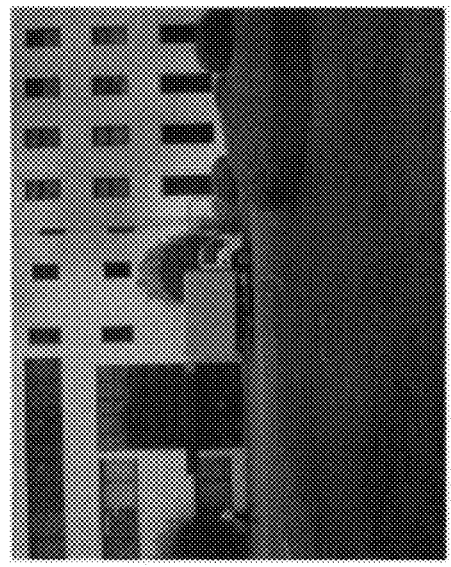

FIGS. 23A and 23B are diagrams illustrating a generation example of the telescopic image that is acquired by the imaging device 30 according to the first embodiment. FIG. 23A illustrates a plurality of captured images (telescopic images), and FIG. 23B illustrates one example of the telescopic image that is generated by performing registration on and compositing the plurality of captured images. FIGS. 24A and 24B are diagrams illustrating a generation example of the wide-angle image that is acquired by the imaging device 30 according to the first embodiment. FIG. 24A illustrates a plurality of captured images (wide-angle images), and FIG. 24B illustrates one example of the wide-angle image that is generated by performing registration on and compositing the plurality of captured images.

In the examples illustrated in FIGS. 23A and 23B and FIGS. 24A and 24B, the ratio of the focal length of the first optical system 21 (wide-angle image optical system) and the focal length of the second optical system 22 (telescopic image optical system) is equal to "7:1". A movement corresponding to nine pixels is made one pixel at a time in a horizontal direction H (pan direction), and a movement corresponding to nine pixels is made one pixel at a time in a perpendicular direction V (tilt direction). Thus, total 81 (=9×9) captured images (the first captured image data D11 and the second captured image data D12) are acquired (refer to FIG. 23A and FIG. 24A). Registration processing and compositing processing are performed for the 81 captured images, and the generated image (the first generated image data D21 (refer to FIG. 24B and the second generated image data D22 (refer to FIG. 23B) is acquired.

As is apparent from comparison of "FIG. 23B" and "(c) of FIG. 20 and (b) of FIG. 20" and comparison of "FIG. 24B" and "(c) of FIG. 21 and (b) of FIG. 21", influence of the crosstalk image can be very effectively reduced by performing compositing processing after performing registration on the plurality of captured images acquired in different states of the optical axis L as in the present embodiment. Particularly, the imaging device 30 of the present embodiment can improve the image quality of all types of images without damaging the image quality of any of a plurality of types of images (a wide-angle image and a telescopic image) that is captured at the same time by optical systems having different focal lengths.

Second Embodiment

In the present embodiment, the same or similar configurations as the imaging device 30 according to the above first embodiment will be designated by the same reference signs and will not be described in detail.

Figure 25:
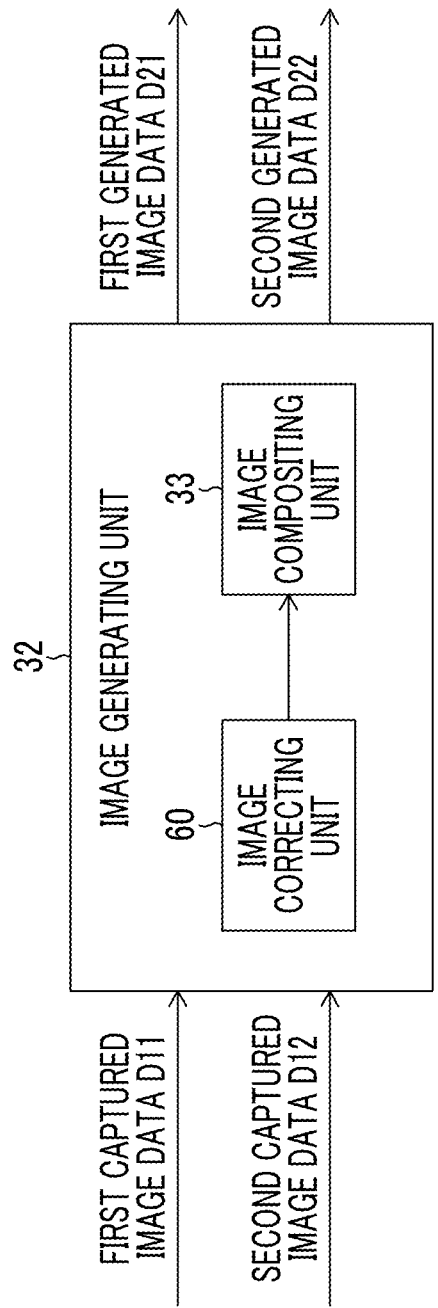
FIG. 25 is a block diagram illustrating a functional configuration example of an image generating unit according to a second embodiment.

FIG. 25 is a block diagram illustrating a functional configuration example of the image generating unit 32 according to a second embodiment.

The image generating unit 32 according to the present embodiment has, in addition to the above image compositing unit 33, an image correcting unit 60 that corrects the first captured image (wide-angle image) and the second captured image (telescopic image).

The image correcting unit 60 corrects the first captured image data D11 and the second captured image data D12 transferred from the imaging element 24 (the first sensor group 24a and the second sensor group 24b), reduces influence of light passing the second optical system 22 in the first captured image (wide-angle image), and reduces influence of light passing the first optical system 21 in the second captured image (telescopic image). The first captured image data D11 and the second captured image data D12 that are corrected by the image correcting unit 60 are transferred to the image compositing unit 33, and the first generated image data D21 and the second generated image data D22 are generated in the image compositing unit 33.

A specific method for the above crosstalk removal processing in the image correcting unit 60 is not particularly limited. The image correcting unit 60 can reduce influence of unnecessary light from the captured image in accordance with, for example, a method below.

Example of Crosstalk Removal Processing

Figure 26B:
FIGS. 26A and 26B illustrate one example of a wide-angle image (refer to FIG. 26A) and a telescopic image (refer to FIG. 26B) that receive influence of decrease in image quality due to interference (crosstalk) of imaging light between a first optical system and a second optical system.
Figure 26A:
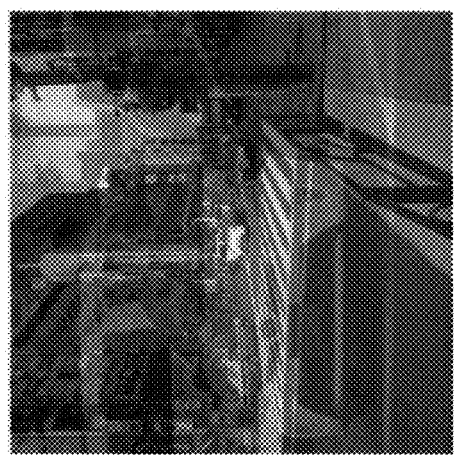

FIGS. 26A and 26B illustrate one example of a wide-angle image (refer to FIG. 26A) and a telescopic image (refer to FIG. 26B) that receive influence of decrease in image quality due to interference (crosstalk) of imaging light between the first optical system 21 and the second optical system 22.

As described above, in the case of not having sufficient performance of pupil division in the imaging optical system 11 and in the imaging element 24, a wide-angle image that is overlaid by a part of a telescopic image component is acquired (refer to FIG. 26A) since the telescopic image light filters into the first sensor group 24a (refer to FIG. 4) that is intended to receive only the wide-angle image light, and a telescopic image that is overlaid by a part of a wide-angle image component is acquired (refer to FIG. 26B) since the wide-angle image light filters into the second sensor group 24b (refer to FIG. 4) that is intended to receive only the telescopic image light.

Figure 27:
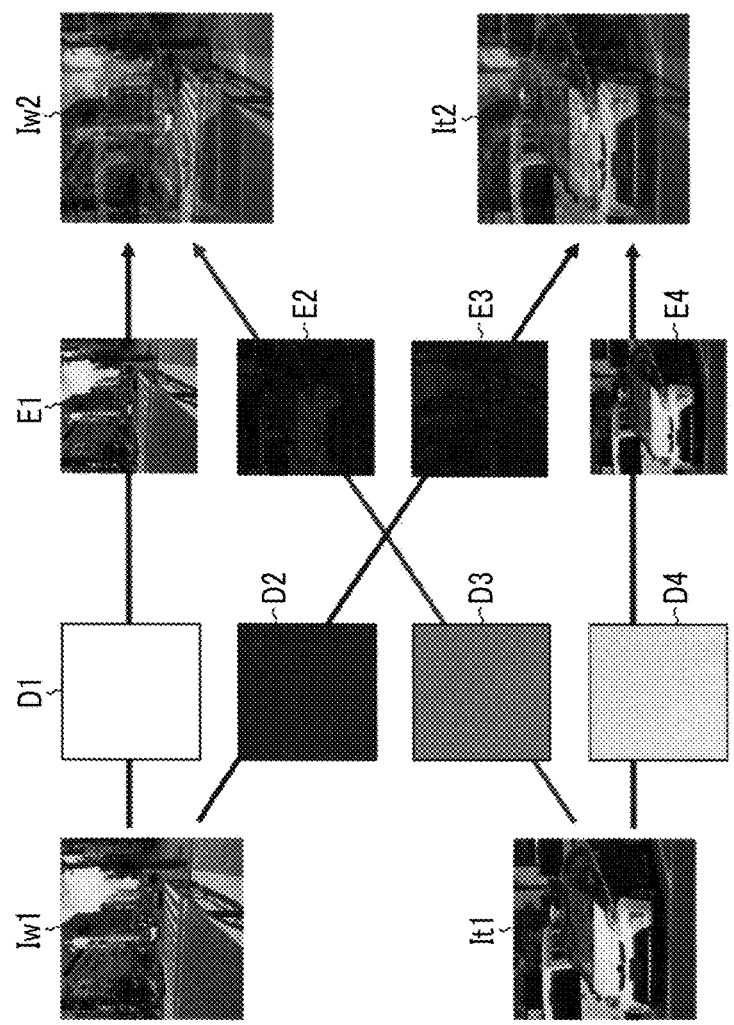
FIG. 27 is a conceptual diagram for describing a mechanism of interference of imaging light between optical systems.

FIG. 27 is a conceptual diagram for describing a mechanism of interference of imaging light between optical systems.

In FIG. 27, the reference sign "Iw1" indicates a true wide-angle image, and the reference sign "It1" indicates a true telescopic image. The "true wide-angle image Iw1" and the "true telescopic image It1" referred hereto are images that are acquired by imaging in the state of no interference between the imaging light passing the first optical system 21 and the imaging light passing the second optical system 22. The reference sign "Iw2" indicates an output wide-angle image that is generated from an imaging signal actually output from the first sensor group 24a (first light receiving sensor 25c), and the reference sign "It2" indicates an output telescopic image that is generated from an imaging signal actually output from the second sensor group 24b (second light receiving sensor 25b).

In the case of imaging a wide-angle image and a telescopic image with the imaging device 30 (refer to FIG. 1 and FIG. 2) that includes the imaging optical system 11 and the imaging element 24 illustrated in FIG. 3, if the imaging device 30 (particularly, the light shielding mask 28 of the imaging element 24) does not have sufficient pupil division performance, imaging signals that represent the true wide-angle image Iw1 and the true telescopic image It1 illustrated in FIG. 27 are output from the imaging element 24. However, as described above, in the case of interference existing between the wide-angle image light and the telescopic image light with insufficient pupil division performance, an imaging signal that represents multiple images in which the wide-angle image and the telescopic image are mixed is output from each of the first sensor group 24a and the second sensor group 24b as the output wide-angle image Iw2 and the output telescopic image It2 illustrated in FIG. 27.

For example, distribution information (indicator) that indicates a component of the imaging light of the true wide-angle image Iw1 appropriately received by the first sensor group 24a (first light receiving sensor 25c) is denoted by a "wide-angle detected gain distribution D1", and distribution information that indicates a component thereof inappropriately received by the second sensor group 24b (second light receiving sensor 25b) is denoted by a "wide-angle crosstalk gain distribution D2" as illustrated in FIG. 27. Distribution information that indicates a component of the imaging light of the true telescopic image It1 inappropriately received by the first sensor group 24a (first light receiving sensor 25c) is denoted by a "telescopic crosstalk gain distribution D3", and distribution information that indicates a component thereof appropriately received by the second sensor group 24b (second light receiving sensor 25b) is denoted by a "telescopic detected gain distribution D4".

In this case, a wide-angle image component that is acquired by applying the wide-angle detected gain distribution D1 to the true wide-angle image Iw1 and received by the first sensor group 24a (first light receiving sensor 25c) is denoted by a "true wide-angle image component E1". A telescopic image component that is acquired by applying the telescopic crosstalk gain distribution D3 to the true telescopic image It1 and received by the first sensor group 24a (first light receiving sensor 25c) is denoted by a "crosstalk telescopic image component E2". A wide-angle image component that is acquired by applying the wide-angle crosstalk gain distribution D2 to the true wide-angle image Iw1 and received by the second sensor group 24b (second light receiving sensor 25b) is denoted by a "crosstalk wide-angle image component E3". A telescopic image component that is acquired by applying the telescopic detected gain distribution D4 to the true telescopic image It1 and received by the second sensor group 24b (second light receiving sensor 25b) is denoted by a "true telescopic image component E4".

In this case, the output wide-angle image Iw2 that is generated from the imaging signal output from the first sensor group 24a (first light receiving sensor 25c) is based on an image that is acquired by adding the true wide-angle image component E1 and the crosstalk telescopic image component E2. The output telescopic image It2 that is generated from the imaging signal output from the second sensor group 24b (second light receiving sensor 25b) is based on an image that is acquired by adding the crosstalk wide-angle image component E3 and the true telescopic image component E4.

As the pupil division performance of the imaging device is more excellent, the wide-angle image light and the telescopic image light are accurately separated and received by the imaging element 24, and the component proportions of the crosstalk telescopic image component E2 and the crosstalk wide-angle image component E3 approximate to zero (blank). The output wide-angle image Iw2 approximates to the true wide-angle image Iw1, and the output telescopic image It2 approximates to the true telescopic image It1. As the pupil division performance of the imaging device is worse, the wide-angle image light and the telescopic image light are received by the imaging element 24 without being sufficiently separated, and the component proportions of the crosstalk telescopic image component E2 and the crosstalk wide-angle image component E3 are increased. The proportion of the crosstalk telescopic image component E2 in the output wide-angle image Iw2 is increased, and the proportion of the crosstalk wide-angle image component E3 in the output telescopic image It2 is increased.

Accordingly, the imaging signal that is output from the imaging element 24 in the case of interference of imaging light existing between optical systems corresponds to an imaging signal in which an image component acquired by applying a detected gain distribution to a true image and an image component acquired by applying a crosstalk gain distribution to an image in another channel are added. Since such crosstalk in the directional sensor (imaging element 24) causes output of an image (imaging signal) in which the wide-angle image and the telescopic image overlay each other, an captured image of degraded image quality is output from the imaging device that does not have sufficient pupil division performance.

Therefore, the image correcting unit 60 (refer to FIG. 25) of the present embodiment performs correction processing for wide-angle image data and telescopic image data to reduce influence of "the telescopic image component mixed into the wide-angle image (that is, the imaging light component of the telescopic image that passes the second optical system 22 and is received by the first light receiving sensor 25c)" and influence of "the wide-angle image component mixed into the telescopic image (that is, the imaging light component of the wide-angle image that passes the first optical system 21 and is received by the second light receiving sensor 25b)".

A specific method for correction processing performed in the image correcting unit 60 is not particularly limited. For example, the image correcting unit 60 can perform correction processing for the wide-angle image and the telescopic image on the basis of an inverse matrix of a matrix that is configured of the detected gain distributions and the crosstalk gain distributions of the wide-angle image (first captured image) and the telescopic image (second captured image).

Hereinafter, a specific example of the image correction processing based on the inverse matrix of the matrix configured of the detected gain distribution and the crosstalk gain distribution will be described.

Figure 28:
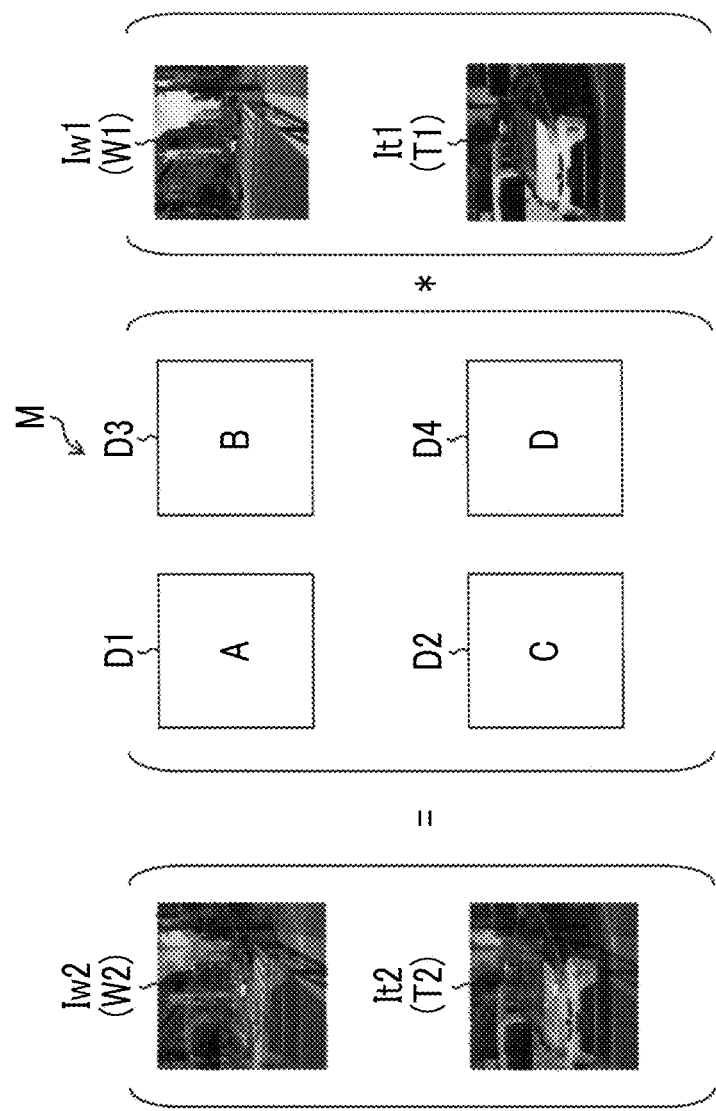
FIG. 28 is a diagram illustrating a relationship between a true wide-angle image, a true telescopic image, an output wide-angle image, an output telescopic image, and a matrix that is configured of a detected gain distribution and a crosstalk gain distribution.

FIG. 28 is a diagram illustrating a relationship among the true wide-angle image Iw1, the true telescopic image It1, the output wide-angle image Iw2, the output telescopic image It2, and a matrix M configured of the detected gain distribution and the crosstalk gain distribution. "The true wide-angle image Iw1, the true telescopic image It1, the output wide-angle image Iw2, and the output telescopic image It2" illustrated in FIG. 28 respectively correspond to "the true wide-angle image Iw1, the true telescopic image It1, the output wide-angle image Iw2, and the output telescopic image It2" illustrated in FIG. 27.

The output wide-angle image Iw2 and the output telescopic image It2 that are generated from the imaging signals output from the imaging element 24 (the first light receiving sensor 25a and the second light receiving sensor 25b) are represented by the product of "the matrix M configured of the detected gain distribution and the crosstalk gain distribution" and "the true wide-angle image Iw1 and the true telescopic image It1 which are the original wide-angle image and the telescopic image generated from the imaging light passing each of the first optical system 21 and the second optical system 22" as illustrated in FIG. 28.

The matrix M that is configured of the detected gain distribution and the crosstalk gain distribution is a 2×2 matrix that is configured of the wide-angle detected gain distribution D1, the wide-angle crosstalk gain distribution D2, the telescopic crosstalk gain distribution D3, and the telescopic detected gain distribution D4 as illustrated in FIG. 28. "The wide-angle detected gain distribution D1, the wide-angle crosstalk gain distribution D2, the telescopic crosstalk gain distribution D3, and the telescopic detected gain distribution D4" illustrated in FIG. 28 respectively correspond to "the wide-angle detected gain distribution D1, the wide-angle crosstalk gain distribution D2, the telescopic crosstalk gain distribution D3, and the telescopic detected gain distribution D4" illustrated in FIG. 27.

Figure 29:
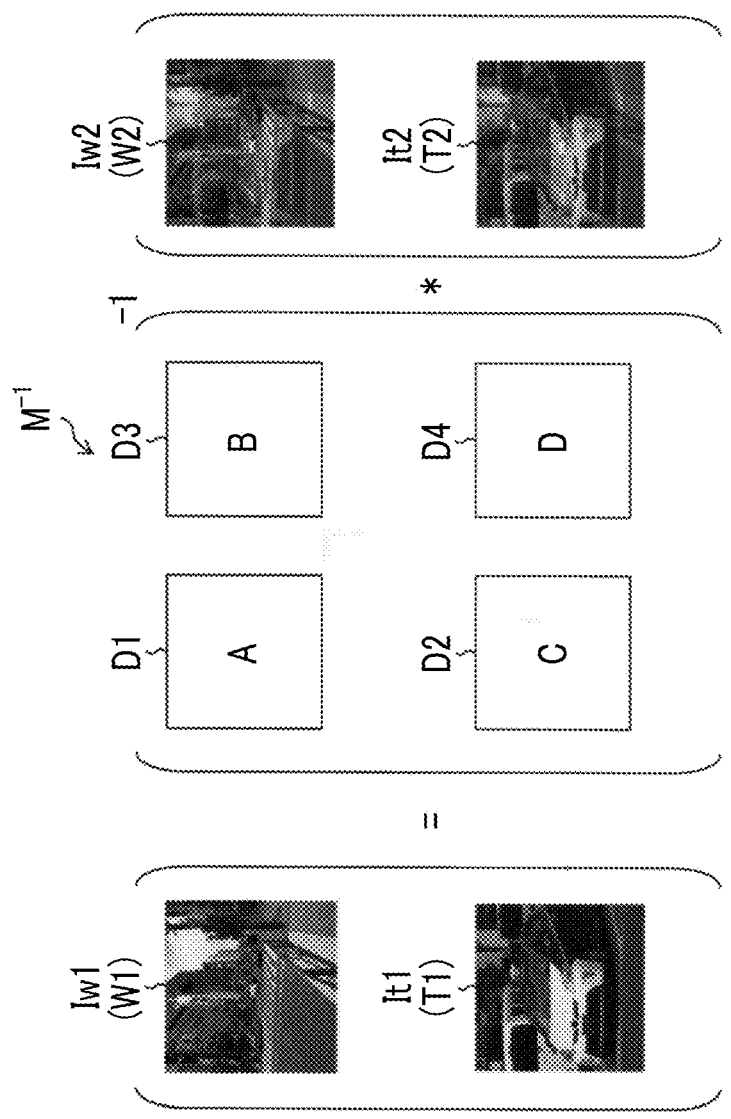
FIG. 29 is a diagram illustrating a determinant that is acquired by applying an inverse matrix of "the matrix that is configured of the detected gain distribution and the crosstalk gain distribution" to the determinant illustrated in FIG. 28.

FIG. 29 is a diagram illustrating a determinant that is acquired by applying an inverse matrix $M^{-1}$ of "the matrix M configured of the detected gain distribution and the crosstalk gain distribution" to a determinant illustrated in FIG. 28. As illustrated in FIG. 29, "the true wide-angle image Iw1 and the true telescopic image It1 which are the original wide-angle image and the telescopic image" can be acquired by the product of the inverse matrix $M^{-1}$ of "the matrix M configured of the detected gain distribution and the crosstalk gain distribution" and "the output wide-angle image Iw2 and the output telescopic image It2 that are generated from the imaging signals output from the imaging element 24 (the first light receiving sensor 25a and the second light receiving sensor 25b)".

FIG. 30 illustrates a determinant that is represented by simplifying the determinant FIG. 29. In FIG. 30, "W1" collectively represents pixel components (pixel values) of the true wide-angle image Iw1. "T1" collectively represents pixel components of the true telescopic image It1. "W2" collectively represents pixel components of the output wide-angle image Iw2. "T2" collectively represents pixel components of the output telescopic image It2. In addition, in FIG. 30, "A", "B", "C", and "D" collectively represent respective elements constituting the wide-angle detected gain distribution D1, the telescopic crosstalk gain distribution D3, the wide-angle crosstalk gain distribution D2, and the telescopic detected gain distribution D4.

FIG. 31 is a diagram illustrating elements w1_11 to w1_mn constituting "W1" illustrated in FIG. 30. That is, "W1" is configured of the elements w1_11 to w1_mn that correspond to the pixel components (pixel values) of the true wide-angle image Iw1. "m" and "n" denote integers greater than or equal to two. "m" and "n" may be the same or different.

Similarly, "W2", "T1", and "T2" illustrated in FIG. 30 are respectively configured of elements w2_11 to w1_mn, t1_11 to t1_mn, and t2_11 to t2_mn that correspond to the pixel components (pixel values) of the output wide-angle image Iw2, the true telescopic image It1, and the output telescopic image It2 (not illustrated). In addition, "A", "B", "C", and "D" illustrated in FIG. 30 are respectively configured of elements a11 to amn, b11 to bmn, c11 to turn, and d11 to dmn that are determined according to each pixel of the wide-angle image and the telescopic image (not illustrated).

FIG. 32 illustrates a calculation formula of "w1_ij" derived on the basis of the determinant illustrated in FIG. 30. FIG. 33 illustrates a calculation formula of "t1_ij" derived on the basis of the determinant illustrated in FIG. 30. In FIG. 32 and FIG. 33, "i" denotes an integer of any of 1 to m, and "j" denotes an integer of any of 1 to n. As illustrated in FIG. 32 and FIG. 33, the elements w1_11 to w1_mn corresponding to the pixel components (pixel values) of the true wide-angle image Iw1 and the elements t1_11 to t1_mn corresponding to the pixel components (pixel values) of the true telescopic image It1 can be calculated by calculation from the output wide-angle image Iw2, the output telescopic image It2, and the inverse matrix $M^{-1}$.

The image correcting unit 60 of the present embodiment can reduce influence of "the telescopic image component mixed into the wide-angle image" or influence of "the wide-angle image component mixed into the telescopic image" by performing correction processing for the wide-angle image data (first captured image data D11) and the telescopic image data (second captured image data D12) on the basis of the calculation formula represented by FIG. 32 and FIG. 33.

From the viewpoint of strictly performing the correction processing, the detected gain distribution and the crosstalk gain distribution are preferably configured of elements in the same number as the number of pixels constituting each of the wide-angle image and the telescopic image, and the inverse matrix $M^{-1}$ for each element (each corresponding pixel) constituting the detected gain distribution and the crosstalk gain distribution is preferably used in the image correcting unit 60. In the case of "the elements constituting the detected gain distribution and the crosstalk gain distribution" approximating to "a part or all of the pixels constituting the wide-angle image and the telescopic image" as in the case of little shading, "the elements constituting the detected gain distribution and the crosstalk gain distribution" may be represented by a common representative value in the range of the approximation from the viewpoint of prioritizing calculation cost. Therefore, in the case of "all of the pixels constituting the wide-angle image and the telescopic image" approximating, the detected gain distribution and the crosstalk gain distribution can be represented by a single representative value, and "the correction processing that is based on the inverse matrix of the matrix configured of the detected gain distribution and the crosstalk gain distribution" can be performed simply and promptly.

The matrix M (refer to "A", "B", "C", and "D" in FIG. 28 to FIG. 30) that is based on the wide-angle detected gain distribution D1, the wide-angle crosstalk gain distribution D2, the telescopic crosstalk gain distribution D3, and the telescopic detected gain distribution D4 is determined by the imaging optical system 11 and the imaging element 24 used in imaging. The image correcting unit 60 stores the elements of the inverse matrix $M^{-1}$ that is derived in advance from the matrix M, and applying the elements of the stored inverse matrix $M^{-1}$ to the output wide-angle image Iw2 and the output telescopic image It2 can reduce influence of the imaging light of the telescopic image in the wide-angle image and reduce influence of the imaging light of the wide-angle image in the telescopic image.

While "the correction processing that is based on the inverse matrix $M^{-1}$ of the matrix M configured of the detected gain distribution and the crosstalk gain distribution" in the above image correcting unit 60 is performed for the wide-angle image data (first captured image data D11) and the telescopic image data (second captured image data D12) acquired from the imaging element 24, the present invention is not limited thereto. For example, "the correction processing that is based on the inverse matrix of the matrix configured of the detected gain distribution and the crosstalk gain distribution" in the image correcting unit 60 may be performed for the wide-angle image data (first captured image data D11) and the telescopic image data (second captured image data D12) that are stored in a memory such as the image storage unit 39 and output to the image generating unit 32.

"The correction processing that is based on the inverse matrix $M^{-1}$ of the matrix M configured of the detected gain distribution and the crosstalk gain distribution" above in the image correcting unit 60 is actually performed for each color channel constituting the wide-angle image data and the telescopic image data. The image correcting unit 60 stores "the inverse matrix $M^{-1}$ of the matrix M configured of the detected gain distribution and the crosstalk gain distribution" related to each color channel. For example, in the case of the imaging element 24 (the first light receiving sensor 25a and the second light receiving sensor 25b) having color filters of RGB (red, green, and blue) with the wide-angle image data (first captured image data D11) and the telescopic image data (second captured image data D12), which are configured of RGB data, output from the imaging element 24 as imaging signals, the image correcting unit 60 retains "the inverse matrix $M^{-1}$ of the matrix M configured of the detected gain distribution and the crosstalk gain distribution" related to the color channels of each of RGB and applies the inverse matrix $M^{-1}$ to the output wide-angle image Iw2 and the output telescopic image It2.

Figure 34B:
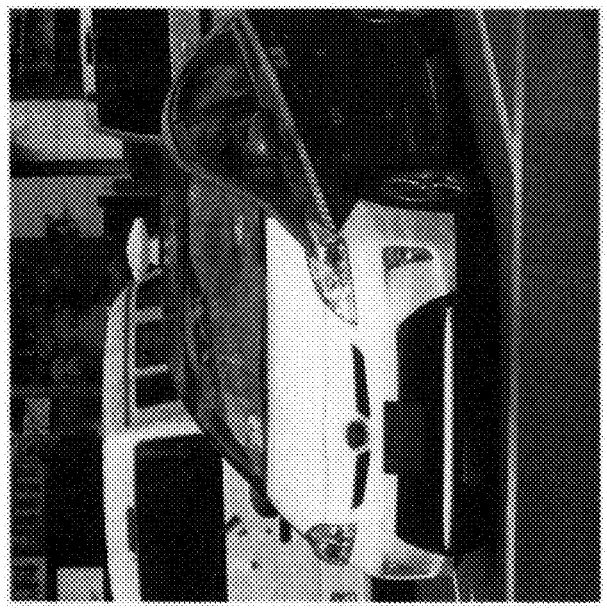
FIGS. 34A and 34B illustrate image examples in the case of performing "correction processing that is based on the inverse matrix of the matrix configured of the detected gain distribution and the crosstalk gain distribution".
Figure 34A:
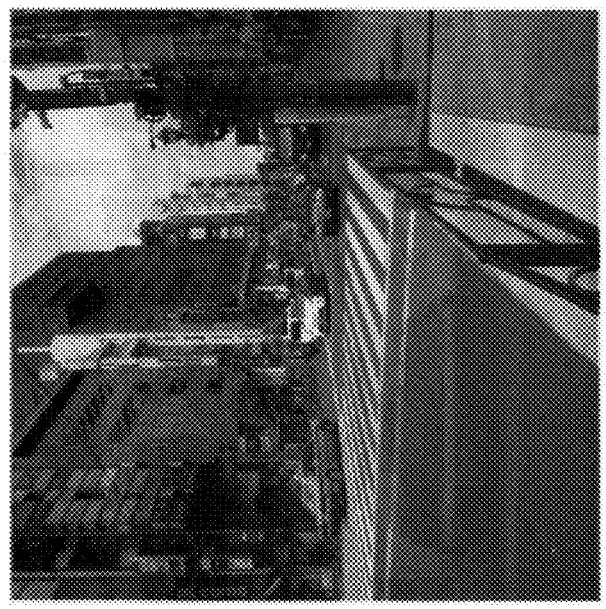
Figure 35B:
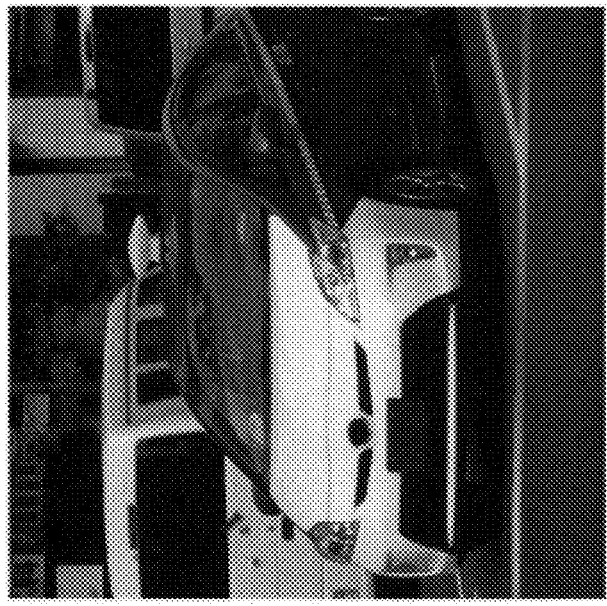
FIGS. 35A and 35B illustrate image examples in the case of performing "post-registration compositing processing" according to the first embodiment after performing "the correction processing based on the inverse matrix of the matrix configured of the detected gain distribution and the crosstalk gain distribution".
Figure 35A:
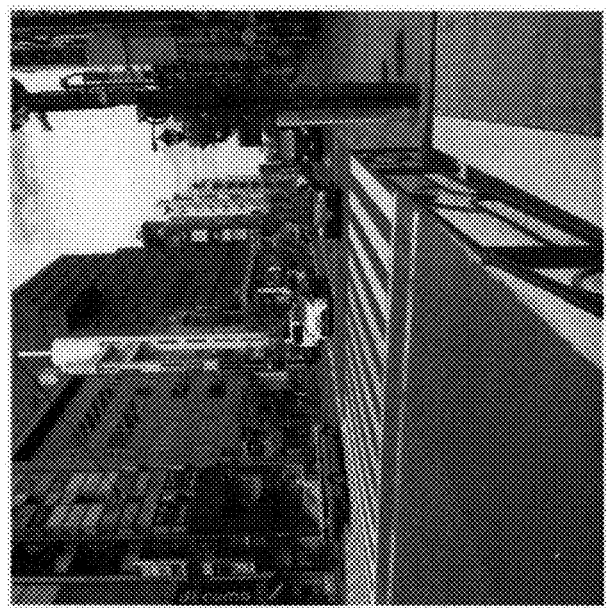

FIGS. 34A and 34B illustrate image examples in the case of performing "the correction processing that is based on the inverse matrix $M^{-1}$ of the matrix M configured of the detected gain distribution and the crosstalk gain distribution". FIG. 34A illustrates a wide-angle image example, and FIG. 34B illustrates a telescopic image example. FIGS. 35A and 35B illustrate image examples in the case of performing "post-registration compositing processing" according to the first embodiment after performing "the correction processing based on the inverse matrix $M^{-1}$ of the matrix M configured of the detected gain distribution and the crosstalk gain distribution". FIG. 35A illustrates a wide-angle image example, and FIG. 35B illustrates a telescopic image example.

In the wide-angle image example illustrated in FIG. 34A, a bright pixel component mixed into the telescopic image component slightly stands out. In the telescopic image example illustrated in FIG. 34B, a sharp contour component mixed into the wide-angle image component slightly stands out. In the wide-angle image example illustrated in FIG. 35A and the telescopic image example illustrated in FIG. 35B according to the present embodiment, the mixed components that stand out in the wide-angle image example illustrated in FIG. 34A and in the telescopic image example illustrated in FIG. 34B are reduced, and images of high image quality that have excellent visibility as a whole are made.

FIG. 36 illustrates another image examples in the case of performing the "post-registration compositing processing" according to the first embodiment after performing "the correction processing based on the inverse matrix $M^{-1}$ of the matrix M configured of the detected gain distribution and the crosstalk gain distribution".

(c) of FIG. 36 illustrates one example of a telescopic captured image (second captured image data D12) that is output from the imaging element 24 (second sensor group 24b). The wide-angle image component and the telescopic image components are mixed at the ratio of "wide-angle image component:telescopic image component=0.49:0.51".

(b) of FIG. 36 illustrates one example of a wide-angle captured image (first captured image data D11) that is output from the imaging element 24 (first sensor group 24c). The wide-angle image component and the telescopic image components are mixed at the ratio of "wide-angle image component:telescopic image component=0.51:0.49".

(c) of FIG. 36 illustrates a telescopic image (second captured image data D12) that is acquired by applying "the correction processing based on the inverse matrix $M^{-1}$ of the matrix M configured of the detected gain distribution and the crosstalk gain distribution (refer to FIG. 28 to FIG. 33)" to the telescopic captured image illustrated in (c) of FIG. 36. In the example illustrated in (c) of FIG. 36, the crosstalk component (wide-angle image component) cannot be completely removed in "the correction processing based on the inverse matrix $M^{-1}$", and a removal residual remains.

(d) of FIG. 36 illustrates a wide-angle image (first captured image data D11) that is acquired by applying "the correction processing based on the inverse matrix $M^{-1}$ of the matrix M configured of the detected gain distribution and the crosstalk gain distribution (refer to FIG. 28 to FIG. 33)" to the wide-angle captured image illustrated in (b) of FIG. 36. In the example illustrated in (d) of FIG. 36, the crosstalk component (telescopic image component) cannot be completely removed in "the correction processing based on the inverse matrix $M^{-1}$", and a removal residual remains.

(e) of FIG. 36 is a plurality of telescopic captured images (second captured image data D12) acquired by two-dimensionally changing the state of the optical axis L of the second optical system 22 and illustrates a plurality of telescopic captured images (refer to (c) of FIG. 36) after "the correction processing based on the inverse matrix of the matrix $M^-$of the matrix M configured of the detected gain distribution and the crosstalk gain distribution (refer to FIG. 28 to FIG. 33)" is applied.

(f) of FIG. 36 is a plurality of wide-angle captured images (first captured image data D11) acquired by two-dimensionally changing the state of the optical axis L of the first optical system 21 and illustrates a plurality of wide-angle captured images (refer to (d) of FIG. 36) after "the correction processing based on the inverse matrix $M^{-1}$ of the matrix M configured of the detected gain distribution and the crosstalk gain distribution (refer to FIG. 28 to FIG. 33)" is applied.

(g) of FIG. 36 illustrates a telescopic generated image (second generated image data D22) that is acquired by performing "registration processing and compositing processing (refer to FIGS. 23A and 23B)" for the plurality of telescopic captured images (second captured image data D12) illustrated in (e) of FIG. 36. In the example illustrated in (g) of FIG. 36, the ratio of the focal length of the first optical system 21 (wide-angle image optical system) and the focal length of the second optical system 22 (telescopic image optical system) is equal to "7:1". A movement corresponding to nine pixels is made one pixel at a time in the horizontal direction H (pan direction), and a movement corresponding to nine pixels is made one pixel at a time in the perpendicular direction V (tilt direction). Thus, a telescopic generated image (second generated image data D22) that is acquired from total 81 (=9×9) telescopic captured images (second captured image data D12) is illustrated.

(h) of FIG. 36 illustrates a wide-angle generated image (first generated image data D21) that is acquired by performing "registration processing and compositing processing (refer to FIGS. 24A and 24B)" for the plurality of wide-angle captured images (first captured image data D11) illustrated in (f) of FIG. 36. In the example illustrated in (h) of FIG. 36, the ratio of the focal length of the first optical system 21 (wide-angle image optical system) and the focal length of the second optical system 22 (telescopic image optical system) is equal to "7:1". A movement corresponding to nine pixels is made one pixel at a time in the horizontal direction H (pan direction), and a movement corresponding to nine pixels is made one pixel at a time in the perpendicular direction V (tilt direction). Thus, a wide-angle generated image (first generated image data D21) that is acquired from total 81 (=9×9) wide-angle captured images (first captured image data D11) is illustrated.

As is apparent from comparison of "(g) of FIG. 36 and (h) of FIG. 36" and "(c) of FIG. 36 and (d) of FIG. 36", an image of high image quality that has excellent visibility as a whole with the crosstalk component reduced can be provided by combining "registration processing and compositing processing" with "the correction processing based on the inverse matrix $M^{-1}$ of the matrix M configured of the detected gain distribution and the crosstalk gain distribution". In addition, as is apparent from comparison of "(g) of FIG. 36 and (h) of FIG. 36" and "FIG. 23B and FIG. 24B", the crosstalk component can be more effectively reduced by combining "the correction processing based on the inverse matrix of the matrix M configured of the detected gain distribution and the crosstalk gain distribution" with "registration processing and compositing processing".

Particularly, the telescopic image illustrated in (c) of FIG. 36 and the wide-angle image illustrated in (b) of FIG. 36 have a ratio of the crosstalk component of "0.49 (=49%)", and the proportion of the crosstalk image to the intended desired image is very high. Even in such a case, a generated image (the first generated image data D21 and the second generated image data D22) in which the crosstalk component illustrated in (g) of FIG. 36 and (h) of FIG. 36 is reduced to an almost invisible level can be acquired by combining correction processing of the image correcting unit 60 with correction processing of the image compositing unit 33 as in the image generating unit 32 of the present embodiment. Therefore, according to the present embodiment, even the imaging element 24 that is inexpensive and has low image separation performance (pupil division performance) can acquire a generated image of high image quality in which a crosstalk component is efficiently reduced, and thus is very useful.

The image correcting unit 60 may perform correction processing other than "the correction processing based on the inverse matrix $M^{-1}$ of the matrix M configured of the detected gain distribution and the crosstalk gain distribution" above. The image correcting unit 60 may perform, for example, "correction processing of correcting the wide-angle image data (first captured image data D11) to reduce influence of an aberration of the first optical system 21" or "correction processing of correcting the telescopic image data (second captured image data D12) to reduce influence of an aberration of the second optical system 22". In addition, the image correcting unit 60, in addition to geometric correction such as positional correction (parallel movement), may perform deformation correction such as trapezoidal correction reflecting the optical property of the imaging optical system 11 (the first optical system 21 and the second optical system 22) or a process for performing shading or correction of adjusting tone. Performing appropriate image correction processing with the image correcting unit 60 reduces an unnecessary component such as noise or shake for an intended desired image component and can acquire a clearer generated image (the first generated image data D21 and the second generated image data D22).

While FIG. 25 illustrates an example of disposing the image correcting unit 60 in a stage before the image compositing unit 33, the position in which the image correcting unit 60 is disposed is not particularly limited. For example, as illustrated in FIG. 37, a plurality of image correcting units (a first image correcting unit 60a and a second image correcting unit 60b) may be disposed in the image generating unit 32, or image correcting units (the first image correcting unit 60a and the second image correcting unit 60b) may be disposed in stages not only before but also after the image compositing unit 33. In the image generating unit 32 illustrated in FIG. 37, for example, the first image correcting unit 60a may perform "the correction processing based on the inverse matrix $M^{-1}$ of the matrix M configured of the detected gain distribution and the crosstalk gain distribution" above, the image compositing unit 33 may generate the generated image data (the first generated image data D21 and the second generated image data D22) from the captured image data (the first captured image data D11 and the second captured image data D12) after correction by the first image correcting unit 60a, and the second image correcting unit 60b may perform another correction processing for the generated image data (the first generated image data D21 and the second generated image data D22). In addition, as illustrated in FIG. 38, the image correcting unit 60 may be disposed in a stage after the image compositing unit 33 in the image generating unit 32.

Third Embodiment

In the present embodiment, the same or similar configurations as the imaging device 30 according to the above embodiments will be designated by the same reference signs and will not be described in detail.

In the above embodiments, imaging is performed along with moving the imaging main body unit 44 including the imaging optical system 11 and the imaging element 24 to image the plurality of first captured images (wide-angle images) in different states of the optical axis L of the first optical system 21 to image the plurality of second captured images (telescopic images) in different states of the optical axis L of the second optical system 22. Meanwhile, in the present embodiment, imaging is performed along with moving the subject to image the plurality of first captured images (wide-angle images) in different states of the optical axis L of the first optical system 21 and to image the plurality of second captured images (telescopic images) in different states of the optical axis L of the second optical system 22.

Therefore, the present embodiment described below is suitable for the case of configuring the imaging device 30 of, for example, a microscope.

FIG. 39 is a block diagram illustrating the imaging device 30 according to a third embodiment. While FIG. 39 illustrates only the imaging main body unit 44 (the imaging optical system 11 and the imaging element 24), the optical system actuator 45, the main controller 37, a subject 64, a subject holding unit 65, and a subject actuator 66, the imaging device 30 illustrated in FIG. 39 includes each unit illustrated in FIG. 7 to FIG. 10 (for example, the image generating unit 32).

The imaging device 30 of the present embodiment further includes the subject holding unit 65 that holds the subject 64 and the subject actuator 66 that moves the subject holding unit 65 under control of the main controller 37.

A specific holding method for the subject holding unit 65 is not particularly limited provided that the subject holding unit 65 can fixedly hold the subject 64.

The subject holding unit 65 of the present example is moved in a sliding manner by the subject actuator 66, and the subject actuator 66 can two-dimensionally move the subject holding unit 65 in a direction that forms a perpendicular with the optical axis L of the imaging optical system 11 (the first optical system 21 and the second optical system 22).

In the imaging device 30 of the present embodiment, imaging the subject 64 with the imaging main body unit 44 along with moving the subject 64 with the subject holding unit 65 under control of the main controller 37 can acquire "a plurality of wide-angle images (first captured images) captured in different states of the optical axis L of the first optical system 21" and "a plurality of telescopic images (second captured images) captured in different states of the optical axis L of the second optical system 22".

In the case of moving the subject 64 as in the present embodiment, the subject image in the captured images (the first captured image data D11 and the second captured image data D12) acquired by the imaging main body unit 44 moves in a direction opposite to "the direction of movement of the subject 64 by the subject actuator 66 and the subject holding unit 65". For example, if the subject 64 slides 10 cm in a horizontal right direction HR (refer to FIG. 39), the subject image in the captured image (the first captured image data D11 and the second captured image data D12) relatively slides 10 cm in the horizontal left direction (refer to the reference sign "HL" in FIG. 39).

In the case of changing the "relative position" of the optical axis L of the imaging optical system 11 as in the present embodiment, the amount of movement of the subject image in the captured image (the first captured image data D11 and the second captured image data D12) tends to be decreased compared with the case of changing the "orientation (angle)" of the optical axis L of the imaging optical system 11 with the pan and tilt device. Therefore, the imaging device 30 of the present embodiment is suitable for the case of requiring precise change of the state of the optical axis L of the imaging optical system 11 as in the case of imaging the subject 64 that is comparatively small.

In the present embodiment, a plurality of captured images (the first captured image data D11 and the second captured image data D12) may be acquired by combining movement of the subject 64 by the subject actuator 66 and the subject holding unit 65 with movement of the imaging main body unit 44 (the imaging optical system 11 and the imaging element 24) by the optical system actuator 45.

Other Modification Examples

The present invention is not limited to the above embodiments and modification examples thereof, and various modifications can be carried out to the extent not departing from the spirit of the present invention.

For example, the above embodiments may be appropriately combined. "The correction processing based on the inverse matrix $M^{-1}$ of the matrix M configured of the detected gain distribution and the crosstalk gain distribution" according to the above second embodiment may be applied to the imaging device 30 according to the above third embodiment that "performs imaging by moving the subject 64 side".

While the example of configuring the imaging optical system 11 of two types of optical systems (the first optical system 21 and the second optical system 22) is described in the above embodiments, the imaging optical system 11 may be configured of three or more types of optical systems.

Each configuration and each function above can be appropriately realized by any hardware, software, or a combination thereof The present invention can be applied to, for example, a non-transitory computer readable recording medium storing a program that causes a computer to execute the above process steps (process procedures), a computer-readable recording medium (non-transitory recording medium) in which such a program is recorded, or a computer on which such a program can be installed.

Embodiments to which the present invention can be applied are not limited to the digital camera 10 illustrated in FIG. 1 and the automatic tracking imaging device 14 illustrated in FIG. 2. The present invention can also be applied to a mobile apparatus type, in addition to a camera type performing imaging as a main function, that includes another function (a calling function, a communication function, or another computer function) other than imaging in addition to an imaging function. Another embodiment to which the present invention can be applied is exemplified by, for example, a mobile phone or a smartphone having a camera function, personal digital assistants (PDA), and a mobile game apparatus. Hereinafter, one example a smartphone to which the present invention can be applied will be described.

Configuration of Smartphone

FIG. 40 is a diagram illustrating the exterior of a smartphone 101 that is one embodiment of the imaging device of the present invention. The smartphone 101 illustrated in FIG. 40 has a plate-shaped casing 102. A display input unit 120 in which a display panel 121 as a display unit and an operating panel 122 as an input unit are integrally formed is disposed on one surface of the casing 102. In addition, the casing 102 includes a speaker 131, a microphone 132, an operating unit 140, and a camera unit 141. The configuration of the casing 102 is not limited thereto and, for example, can employ a configuration in which a display unit and an input unit are independently disposed or employ a configuration that has a folding structure or a sliding mechanism.

FIG. 41 is a block diagram illustrating a configuration of the smartphone 101 illustrated in FIG. 40. As illustrated in FIG. 41, a wireless communication unit 110, the display input unit 120, a calling unit 130, the operating unit 140, the camera unit 141, a storage unit 150, an external input and output unit 160, a global positioning system (GPS) receiving unit 170, a motion sensor unit 180, a power supply unit 190, and a main control unit 100 are included as main constituents of the smartphone 101. In addition, a wireless communication function that performs mobile wireless communication through a base station apparatus and a mobile communication network is included as a main function of the smartphone 101.

The wireless communication unit 110 performs wireless communication with the base station apparatus connected to the mobile communication network in accordance with an instruction from the main control unit 100. With use of the wireless communication, transmission and reception of various types of file data such as audio data and image data, electronic mail data, and the like and reception of Web data, streaming data, and the like are performed.

The display input unit 120 is a so-called touch panel including the display panel 121 and the operating panel 122 and, by control of the main control unit 100, visually delivers information to the user by displaying an image (a still image and a moving image), character information, or the like, and detects a user operation for the displayed information.

The display panel 121 uses a liquid crystal display (LCD), an organic electro-luminescence display (OELD), or the like as a display device. The operating panel 122 is a device that is disposed in a state where an image displayed on a display surface of the display panel 121 is visible and that detects one or a plurality of coordinates operated with a finger of the user or a stylus. If the device is operated with a finger of the user or the stylus, the operating panel 122 outputs a detected signal generated by the operation to the main control unit 100. Next, the main control unit 100 detects the position of the operation (coordinates) on the display panel 121 on the basis of the received detected signal.

The display panel 121 and the operating panel 122 of the smartphone 101 illustrated in FIG. 40 as one embodiment of the imaging device of the present invention integrally constitute the display input unit 120, and the operating panel 122 is arranged to completely cover the display panel 121. In the case of employing the arrangement, the operating panel 122 may include a function of detecting a user operation even in an area outside of the display panel 121. In other words, the operating panel 122 may include a detection area (hereinafter, referred to as a "display area") for an overlaying part thereof that overlays the display panel 121 and a detection area (hereinafter referred to as a "non-display area") for a peripheral part thereof other than the overlaying part that does not overlay the display panel 121.

The size of the display area may completely match the size of the display panel 121, but both sizes may not necessarily match. In addition, the operating panel 122 may include two responsive areas of a peripheral part thereof and an inner part thereof other than the peripheral part. Furthermore, the width of the peripheral part is appropriately designed according to the size or the like of the casing 102. Furthermore, a position detection method employed in the operating panel 122 is exemplified by a matrix switch method, a resistive film method, a surface acoustic wave method, an infrared method, an electromagnetic induction method, an electrostatic capacitive method, or the like, and any method may be employed.

The calling unit 130 includes the speaker 131 and the microphone 132. The calling unit 130 converts the voice of the user input through the microphone 132 into audio data processable in the main control unit 100 and outputs the audio data to the main control unit 100, or decodes audio data received by the wireless communication unit 110 or the external input and output unit 160 and causes the decoded audio data to be output from the speaker 131. As illustrated in FIG. 40, for example, the speaker 131 can be mounted on the same surface as the surface on which the display input unit 120 is disposed, and the microphone 132 can be mounted on a side surface of the casing 102.

The operating unit 140 is a hardware key in which a key switch or the like is used, and receives an instruction from the user. For example, as illustrated in FIG. 40, the operating unit 140 is a push-button switch that is mounted on a side surface of the casing 102 of the smartphone 101, is placed into a switch ON state if being pushed with a finger or the like, and is placed into a switch OFF state by a restoring force of a spring or the like if the finger is separated.

The storage unit 150 stores a control program and control data of the main control unit 100, application software, address data in which a name, a telephone number, and the like of a communication party are associated, data of a transmitted or received electronic mail, Web data downloaded by Web browsing, downloaded contents data, and the like and temporarily stores streaming data and the like. In addition, the storage unit 150 is configured of a smartphone-incorporated internal storage unit 151 and an external storage unit 152 having a slot for detachable external memory. Each of the internal storage unit 151 and the external storage unit 152 constituting the storage unit 150 is realized by using a storage medium such as a memory of a flash memory type, a hard disk type, a multimedia card micro type, or a card type (for example, a MicroSD (registered trademark) memory); a random access memory (RAM); or a read only memory (ROM).

The external input and output unit 160 acts as an interface with all external apparatuses connected to the smartphone 101 and is directly or indirectly connected to another external apparatus by communication or the like (for example, Universal Serial Bus (USB) or IEEE1394) or a network (for example, the Internet, a wireless LAN, Bluetooth (registered trademark), radio frequency identification (RFID), Infrared Data Association (IrDA) (registered trademark), Ultra Wideband (UWB) (registered trademark), or ZigBee (registered trademark)).

Examples of the external apparatuses connected to the smartphone 101 include a wired/wireless headset, a wired/wireless external changer, a wired/wireless data port, a memory card or a subscriber identity module (SIM)/user identity module card (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, a PDA connected in a wired/wireless manner, and an earphone connected in a wired/wireless manner. The external input and output unit 160 may be configured to deliver data transferred from such an external apparatus to each constituent in the smartphone 101 or to transfer data in the smartphone 101 to an external apparatus.

The GPS receiving unit 170, in accordance with an instruction from the main control unit 100, receives a GPS signal transmitted from GPS satellites ST1, ST2, ..., STn, executes position measurement calculation processing based on a plurality of received GPS signals, and detects a position specified by the latitude, the longitude, and the altitude of the smartphone 101. The GPS receiving unit 170, in the case of being capable of acquiring positional information from the wireless communication unit 110 and/or the external input and output unit 160 (for example, a wireless local area network (LAN)), can detect the position by using the positional information.

The motion sensor unit 180 includes, for example, a three-axis acceleration sensor and detects a physical motion of the smartphone 101 in accordance with an instruction from the main control unit 100. Detection of a physical motion of the smartphone 101 allows the moving direction or the acceleration of the smartphone 101 to be detected. The result of the detection is output to the main control unit 100.

The power supply unit 190 supplies power stored in a battery (not illustrated) to each unit of the smartphone 101 in accordance with an instruction from the main control unit 100.

The main control unit 100 includes one or a plurality of microprocessors, operates in accordance with the control program and the control data stored in the storage unit 150, and generally controls each unit of the smartphone 101. In the present example, the main control unit acts as, for example, the image generating unit 32 (image compositing unit 33), the main controller 37, and the image processing unit 38. In addition, the main control unit 100 includes a mobile communication control function of controlling each unit of a communication system and an application processing function in order to perform audio communication and data communication through the wireless communication unit 110.

The application processing function is realized by the main control unit 100 operating in accordance with the application software stored in the storage unit 150. Examples of the application processing function include an infrared communication function that performs data communication with a counterpart apparatus by controlling the external input and output unit 160, an electronic mailing function of transmitting or receiving an electronic mail, and a Web browsing function of browsing a Web page.

In addition, the main control unit 100 includes an image processing function such as displaying a video on the display input unit 120 on the basis of image data (data of a still image or a moving image) such as received data, downloaded streaming data, or the like. The image processing function refers to a function of the main control unit 100 that decodes the image data, performs image processing for the decoding result, and displays an image acquired through the image processing on the display input unit 120.

The main control unit 100 executes a display control for the display panel 121 and an operation detection control of detecting a user operation performed through the operating unit 140 or the operating panel 122.

The main control unit 100, by executing the display control, displays an icon for launching the application software or a software key such as a scroll bar or displays a window for writing an electronic mail. The scroll bar refers to a software key for receiving an instruction to move a displayed part of an image for a large image or the like that does not fit in the display area of the display panel 121.

The main control unit 100, by executing the operation detection control, detects a user operation performed through the operating unit 140, receives an operation performed for the icon or an input of a character string in an input field of the window through the operating panel 122, or receives a scroll request for a displayed image through the scroll bar.

Furthermore, the main control unit 100 includes a touch panel control function that, by execution of the operation detection control, determines whether the position of an operation performed for the operating panel 122 corresponds to the overlaying part (display area) overlaying the display panel 121 or corresponds to the peripheral part (non-display area) other than the overlaying part not overlaying the display panel 121 and that controls the displayed position of the responsive area of the operating panel 122 or the software key.

In addition, the main control unit 100 can detect a gesture operation performed for the operating panel 122 and execute a preset function in response to the detected gesture operation. The gesture operation is not a simple touch operation in the related art and means an operation of drawing a trajectory with a finger or the like, specifying a plurality of positions at the same time, or, as a combination thereof, drawing a trajectory from at least one of a plurality of positions.

The camera unit 141 is a digital camera that performs electronic imaging with use of an imaging element such as a complementary metal oxide semiconductor (CMOS). The camera unit 141, by control of the main control unit 100, can convert image data acquired by imaging into compressed image data such as Joint Photographic Experts Group (JPEG) and record the image data in the storage unit 150 or output the image data through the external input and output unit 160 or the wireless communication unit 110. While the camera unit 141 is mounted on the same surface as the display input unit 120 in the smartphone 101 as illustrated in FIG. 40, the position of mounting of the camera unit 141 is not limited thereto. The camera unit 141 may be mounted on the rear surface of the casing 102 and not on the surface of the casing 102 on which the display input unit 120 is mounted, or a plurality of the camera units 141 may be mounted on the casing 102. In the case of mounting a plurality of the camera units 141, imaging may be performed with one camera unit 141 by switching the camera unit 141 to be used in imaging, or imaging may be performed by using the plurality of camera units 141 at the same time.

In addition, the camera unit 141 can be used in various functions of the smartphone 101. For example, an image acquired in the camera unit 141 may be displayed on the display panel 121, or an image that is captured and acquired in the camera unit 141 may be used as one of operation input methods for the operating panel 122. In addition, when the GPS receiving unit 170 detects a position, the position may be detected by referencing the image from the camera unit 141. Furthermore, determination of the direction of the optical axis of the camera unit 141 of the smartphone 101 or determination of the current usage environment can be performed by referencing the image from the camera unit 141 without using the three-axis acceleration sensor or with use of the three-axis acceleration sensor. Apparently, the image from the camera unit 141 can be used in the application software.

Besides, data that is acquired by adding positional information acquired by the GPS receiving unit 170, audio information acquired by the microphone 132 (may be converted into text information by audio text conversion by the main control unit or the like), attitude information acquired by the motion sensor unit 180, or the like to image data of a still picture or a motion picture can be recorded in the storage unit 150 or be output through the external input and output unit 160 or the wireless communication unit 110.

The image generating unit 32, the image processing unit 38, the display controller 40, the main controller 37, and the like above (refer to FIG. 7) can be realized by, for example, the main control unit 100.

EXPLANATION OF REFERENCES

10: digital camera
11: imaging optical system
12: release button
13: flash
14: automatic tracking imaging device
15: device main body
16: pedestal
17: dome cover
18: holding unit
19: gear
21a: first wide-angle lens
21b: second wide-angle lens
21c: third wide-angle lens
21d: fourth wide-angle lens
21: first optical system
22a: first telescopic lens
22b: first telescopic reflector
22c: first telescopic reflective mirror
22d: second telescopic reflector
22e: second telescopic reflective mirror
22: second optical system
23: common lens
24a: first sensor group
24b: second sensor group
24: imaging element
25a: first light receiving sensor
25b: second light receiving sensor
25: light receiving sensor
26: microlens
27: interlayer
28: light shielding mask
29: photodiode
30: imaging device
32: image generating unit
33: image compositing unit
34: alignment data acquiring unit
35: compositing processing unit
37: main controller
38: image processing unit
39: image storage unit
40: display controller
41: display unit
42: user operating unit
44: imaging main body unit
45: optical system actuator
60a: first image correcting unit
60b: second image correcting unit
60: image correcting unit
64: subject
65: subject holding unit
66: subject actuator
100: main control unit
101: smartphone
102: casing
110: wireless communication unit
120: display input unit
121: display panel
122: operating panel
130: calling unit
131: speaker
132: microphone
140: operating unit
141: camera unit
150: storage unit
151: internal storage unit
152: external storage unit
160: external input and output unit
170: GPS receiving unit
180: motion sensor unit
190: power supply unit

What is claimed is:

1. An imaging device comprising:
an imaging optical system that includes a first optical system and a second optical system having a common optical axis and having different focal lengths;
an imaging element that includes a first sensor group selectively receiving light passing the first optical system and a second sensor group selectively receiving light passing the second optical system; and
an image generating unit that generates a first generated image on the basis of a first captured image output from the first sensor group and generates a second generated image on the basis of a second captured image output from the second sensor group,
wherein the image generating unit has an image compositing unit, and
the image compositing unit
generates the first generated image by performing registration on a plurality of the first captured images captured in different states of the optical axis of the first optical system and by compositing the registered plurality of first captured images, and
generates the second generated image by performing registration on a plurality of the second captured images captured in different states of the optical axis of the second optical system and by compositing the registrated plurality of second captured images.

2. The imaging device according to claim 1,
wherein the plurality of first captured images is captured in different states of a direction of the optical axis of the first optical system and output from the first sensor group, and
the plurality of second captured images is captured in different states of a direction of the optical axis of the second optical system and output from the second sensor group.

3. The imaging device according to claim 1.
wherein the plurality of first captured images is captured in different states of a relative position of the optical axis of the first optical system with respect to a subject and output from the first sensor group, and
the plurality of second captured images is captured in different states of a relative position of the optical axis of the second optical system with respect to the subject and output from the second sensor group.

4. The imaging device according to claim 1,
wherein the image compositing unit
performs registration on the plurality of first captured images on the basis of the state of the optical axis of the first optical system and a focal length of the first optical system, and
performs registration on the plurality of second captured images on the basis of the state of the optical axis of the second optical system and a focal length of the second optical system.

5. The imaging device according to claim 1,
wherein the image compositing unit
acquires a position of a first reference image portion in each of the plurality of first captured images by analyzing the plurality of first captured images and performs registration on the plurality of first captured images on the basis of the position of the first reference image portion, and
acquires a position of a second reference image portion in each of the plurality of second captured images by analyzing the plurality of second captured images and performs registration on the plurality of second captured images on the basis of the position of the second reference image portion.

6. The imaging device according to claim 1,
wherein the image compositing unit
composites the plurality of first captured images by adding data of the registrated plurality of first captured images and calculating the average of the data after addition, and
composites the plurality of second captured images by adding data of the registrated plurality of second captured images and calculating the average of the data after addition.

7. The imaging device according to claim 1,
wherein the image compositing unit
composites the plurality of first captured images by calculating the weighted mean of data of the plurality of first captured images on the basis of a weight that is determined in accordance with the state of the optical axis of the first optical system at the time of imaging, and
composites the plurality of second captured images by calculating the weighted mean of data of the plurality of second captured images on the basis of a weight that is determined in accordance with the state of the optical axis of the second optical system at the time of imaging.

8. The imaging device according to claim 7,
wherein the weight that is determined in accordance with the state of the optical axis of the first optical system is determined by a Gaussian distribution based on the state of the optical axis of the first optical system, and
the weight that is determined in accordance with the state of the optical axis of the second optical system is determined by a Gaussian distribution based on the state of the optical axis of the second optical system.

9. The imaging device according to claim 1,
wherein the plurality of first captured images is more densely imaged as the optical axis of the first optical system is closer to a reference state, is more sparsely imaged as the optical axis of the first optical system is more away from the reference state, and is output from the first sensor group, and
the plurality of second captured images is more densely imaged as the optical axis of the second optical system is closer to a reference state, is more sparsely imaged as the optical axis of the second optical system is more away from the reference state, and is output from the second sensor group.

10. The imaging device according to claim 9,
wherein a distribution density of the state of the optical axis of the first optical system at the time of capturing the plurality of first captured images is determined on the basis of a Gaussian distribution, and
a distribution density of the state of the optical axis of the second optical system at the time of capturing the plurality of second captured images is determined on the basis of a Gaussian distribution.

11. The imaging device according to claim 1,
wherein the image generating unit further has an image correcting unit that performs correction of the first captured image and the second captured image, reduces influence of light passing the second optical system in the first captured image, and reduces influence of light passing the first optical system in the second captured image.

12. The imaging device according to claim 11,
wherein the image correcting unit performs the correction on the basis of an inverse matrix of a matrix that is configured of a detected gain distribution and a crosstalk gain distribution of the first captured image and the second captured image.

13. The imaging device according to claim 11,
wherein the image correcting unit, furthermore, corrects the first captured image to reduce influence of an aberration of the first optical system and corrects the second captured image to reduce influence of an aberration of the second optical system.

14. The imaging device according to claim 1,
wherein the plurality of first captured images is captured in one-dimensionally different states of the optical axis of the first optical system and output from the first sensor group, and
the plurality of second captured images is captured in one-dimensionally different states of the optical axis of the second optical system and output from the second sensor group.

15. The imaging device according to claim 1,
wherein the plurality of first captured images is captured in two-dimensionally different states of the optical axis of the first optical system and output from the first sensor group, and the plurality of second captured images is captured in two-dimensionally different states of the optical axis of the second optical system and output from the second sensor group.

16. The imaging device according to claim 1, further comprising:
an optical system actuator that changes the states of the optical axes of the first optical system and the second optical system by moving the imaging optical system.

17. The imaging device according to claim 16,
wherein the optical system actuator is a pan and tilt device that pans and tilts the imaging optical system.

18. The imaging device according to claim 1, further comprising:
a subject holding unit that holds a subject; and
a subject actuator that moves the subject holding unit.

19. An imaging method in an imaging device including an imaging optical system that includes a first optical system and a second optical system having a common optical axis and having different focal lengths, an imaging element that includes a first sensor group selectively receiving light passing the first optical system and a second sensor group selectively receiving light passing the second optical system, and an image generating unit that generates a first generated image on the basis of a first captured image output from the first sensor group and generates a second generated image on the basis of a second captured image output from the second sensor group, the method comprising:
in the image generating unit,
a step of performing registration on a plurality of the first captured images captured in different states of the optical axis of the first optical system;
a step of generating the first generated image by compositing the registrated plurality of first captured images;
a step of performing registration on a plurality of the second captured images captured in different states of the optical axis of the second optical system; and
a step of generating the second generated image by compositing the registrated plurality of second captured images.

20. A non-transitory computer readable recording medium storing a program that causes a computer to execute procedures of an imaging method in an imaging device including an imaging optical system that includes a first optical system and a second optical system having a common optical axis and having different focal lengths, an imaging element that includes a first sensor group selectively receiving light passing the first optical system and a second sensor group selectively receiving light passing the second optical system, and an image generating unit that generates a first generated image on the basis of a first captured image output from the first sensor group and generates a second generated image on the basis of a second captured image output from the second sensor group, the procedures comprising:
in the image generating unit,
a procedure of performing registration on a plurality of the first captured images captured in different states of the optical axis of the first optical system;
a procedure of generating the first generated image by compositing the registrated plurality of first captured images;
a procedure of performing registration on a plurality of the second captured images captured in different states of the optical axis of the second optical system; and
a procedure of generating the second generated image by compositing the registrated plurality of second captured images.

* * * * *